US007523086B1

(12) United States Patent
Teague et al.

(10) Patent No.: US 7,523,086 B1
(45) Date of Patent: Apr. 21, 2009

(54) SYSTEM FOR RETRIEVING AND PROCESSING STABILITY DATA FROM WITHIN A SECURE ENVIRONMENT

(75) Inventors: Tommy Kay Teague, Mission Viejo, CA (US); Willis Lloyd Jacobs, Mission Viejo, CA (US); Thomas Adrian Valverde, Anaheim, CA (US); Kathryn Ann McDonald, Yorba Linda, CA (US)

(73) Assignee: Unisys Corporation, Blue Bell, PA (US)

( * ) Notice: Subject to any disclaimer, the term of this patent is extended or adjusted under 35 U.S.C. 154(b) by 229 days.

(21) Appl. No.: 10/352,661

(22) Filed: Jan. 28, 2003

(51) Int. Cl.
*G06F 17/30* (2006.01)
(52) U.S. Cl. .......................................... 707/1; 711/152
(58) Field of Classification Search ...................... 707/3, 707/103, 10, 204, 1; 711/152; 713/201, 713/153; 709/201, 207; 715/505; 719/331
See application file for complete search history.

(56) References Cited

U.S. PATENT DOCUMENTS

| 4,815,030 | A | 3/1989 | Cross et al. |
| 6,026,392 | A | 2/2000 | Kouchi et al. |
| 6,128,647 | A | 10/2000 | Haury |
| 6,141,699 | A | 10/2000 | Luzzi et al. |
| 6,301,584 | B1 | 10/2001 | Ranger |
| 6,711,678 | B2 * | 3/2004 | Ferguson ..................... 713/153 |
| 2002/0099735 | A1 * | 7/2002 | Schroeder et al. ........... 707/513 |
| 2003/0056063 | A1 * | 3/2003 | Hochmuth et al. .......... 711/152 |
| 2003/0208596 | A1 * | 11/2003 | Carolan et al. .............. 709/225 |

* cited by examiner

*Primary Examiner*—Don Wong
*Assistant Examiner*—Sheree N Brown
(74) *Attorney, Agent, or Firm*—Nathan Cass; Alfred W. Kozak

(57) ABSTRACT

A system is provided for systematically checking for and retrieving data from a known, public system to a system inside company firewall restraints while being able to function automatically once initial set up is complete. This data is then processed and stored into an internal database for the express purpose of allowing timely access to stability and configuration information.

10 Claims, 21 Drawing Sheets

CMPTRANSPORT OVERVIEW

CMPTRANSPORT OVERVIEW

PROCESSFILES DATAFLOW

PROCEDURE: PROCESSFILES
(OF 1E OF FIG. 1)

PROCEDURE: IMPORTXMLFILES

PROCEDURE: IMPORTNUL_XMLFILES

PROCEDURE: EXPORTXMLFILES

PROCEDURE: OPENXMLANDFINDVERSION

PROCEDURE: READXMLFILE

PROCEDURE: MOVEXMLFILES

PROCEDURE: MAKECONNECTION

SYSTEM FOR RETRIEVING AND PROCESSING STABILITY DATA FROM WITHIN A SECURE ENVIRONMENT

FIELD OF THE INVENTION

The present invention generally relates to a method which will systematically check for and retrieve data from a known, public system to a system inside company firewall restraints. This data is processed and stored into an internal database for the express purpose of allowing timely access to stability and configuration information, for field engineers or managers within a proprietary company database. The method is able to function virtually unattended once initial set up is complete.

CROSS-REFERENCES TO RELATED APPLICATIONS

This application is related to co-pending U.S. Ser. No. 10/308,388, entitled "Method For Scanning Windows Event Logs In A Cellular Multi-Processing CMP Server", which is incorporated herein by reference.

This application is related to co-pending U.S. Ser. No. 10/308,370, entitled "Method For Collecting And Transporting Stability Data", which is incorporated herein by reference.

BACKGROUND OF THE INVENTION

Previous methods for transporting customer configuration and stability information were prone to breaches of system security, cumbersome and either too costly in terms of processor utilization or not current. A means was necessary to provide a mechanism whereas data could be swiftly retrieved from a known public location into an internal, secure system-operating environment in a regular and timely manner, without using excessive amounts of the processor.

The general purpose of the software methodology described herein is to systematically check for and retrieve data from a known, public system to a system inside company firewall restraints. This data is processed and stored into an internal database for the express purpose of allowing timely access to stability and configuration information, for field engineers or managers within the company. The method is able to function virtually unattended once initial set up is complete. This methodology is part of a system designated as the Availability Monitor System.

One prior art method to which the method of the present invention generally relates is described in U.S. Pat. No. 6,128,647 entitled "Self Configuring Peer To Peer Inter Process Messaging System". This prior art method provides remote program execution, data transport, message communication, status communication and relocation of computer resources by using an arbiter associated with each computer. An originating arbiter of a process resource sends messages between arbiters that are received by each arbiter and then sent to a destination arbiter, if required. If necessary, the message may be retransmitted by intermediate arbiters and eventually received by the destination arbiter, which interprets, and executes the message. As a result, the arbiters provide actual communication between the resources. Each arbiter may be resident in each of a plurality of computers, which are part of a network linked by a network. Each arbiter independently reviews and processes the messages so that the computers communicate directly with each other on a peer to peer basis without the need for a master controlling program or other gateway for controlling and processing the messages as the messages are transmitted between computers.

The present invention differs from the above prior cited art in that the prior invention focuses on self-configuring or remote program execution. The method of the present invention retrieves files from a public location and processes them within a secure environment, which is not related to the method of the prior art.

Yet another prior art method to which the method of the present invention generally relates is described in U.S. Pat. No. 6,301,584 entitled "System And Method For Retrieving Entities And Integrating Data." This prior art method is a data integration system and method which gathers information dynamically from one or more data sources, which may be located at different servers and have incompatible formats, then structures the information into a configurable, object-oriented information model, and outputs the information for the user according to an associated, configurable visual representation with automatic content classification.

The present invention differs from this prior art in that the cited prior art deals with integrating data. This is in no way related to the method of the present invention, which is to retrieves files collected in known public locations for processing at a secure central site. The data in these files is then used to update a central database.

Yet another prior art method to which the method of the present invention generally relates is described in U.S. Pat. No. 6,141,699 entitled "Interactive Display System For Sequential Retrieval And Display Of A Plurality Of Interrelated Data Sets". This prior art method is a method, system and program product for monitoring, from a client computer system, the performance of an application program residing on a server computer system. A probe program residing at the client computer generates requests for the services of the application program and records transaction records based upon service responses from there. The requests and transaction record generation is controlled by a set of probe configuration information units at the client computer. Transaction records are provided to a central repository whereat statistical information is pre-processed and inserted into statistics tables. A display system enables a computer user to interactively request and view a plurality of displays of data sets of the monitoring data. Each data set includes data elements, which may be interactively indicated by the viewer to cause the retrieval and display of related data sets having data elements associated with those in the original display.

The present invention differs from this prior art in that this referenced prior art deals with interactive displays. This prior art method does not teach the method of the present invention of updating a central database with data contained in files sent from a myriad of sites through a firewall.

Yet another prior art method to which the method of the present invention generally relates is described in U.S. Pat. No. 6,026,392 entitled "Data Retrieval Method And Apparatus With Multiple Source Capability". This prior art method involves a generation of output or reports on information contained in a data source which may be any of two or more types of source data, in a standardized or uniform manner. A plurality of drivers are provided specific to different types of source data which include programming for identifying structural or other characteristics of the various data sources, e.g. for use in defining a new database. Preferably the new database is configured to permit highly flexible and/or rapid output or reporting or is otherwise optimized for reporting purposes. In one embodiment, this prior invention includes conversion of one or more data sources into one or more uniform databases, preferably generating one or more key categories for organizing the data, optionally generating categories groupings or rollups and additional data or optional references. In one embodiment, one or more databases are created which have a degree of uniformity of structure, even though they may be based on two or more different data sources, which may have very different structures. The different data sources are automatically analyzed and this analysis can be used to identify and/or create categories of data for use in organizing the data.

The present invention differs from this prior art in that the referenced prior art teaches the actual structure of the database, whereas the method of the present invention teaches how specialized files can be organized in a database for ease of evaluation of partitions and service processors. This prior art is unrelated to the present inventions method of using a database to store data that has been retrieved from customer sites.

Yet another prior art method to which the method of the present invention generally relates is described in U.S. Pat. No. 4,815,030 entitled "Multitask Subscription Data Retrieval System". This prior art method is a multitask multi-user system which provides for efficient transfer of data from a remote data base to individual subscribers and has particular utility in the distribution of stock market data. A primary provider distributes the incoming data directly to user tasks or to an inquiry provider or a monitor provider. The inquiry provider responds to specific inquiries by users for information in the database. The monitor provider maintains lists of information, which are being monitored by the host computer for individual users. The inquiry provider and the monitor provider do not repeat requests to the remote database where a similar request is already pending from another user. Data transfer paths between tasks are established by a code module, which may be linked to any of the tasks. The transfer paths are established using information from a configuration list and they are monitored by the operating system through a wait list established for each user task. Providers in the system may establish subscriber lists through the code module.

The present invention differs from this prior art in that the method of the present invention does not relate to multi-tasking or a multi-user system, as does the cited prior art. The prior art method is unrelated to the present method, which is intended for one central secure engineering site to retrieve files from multiple customer sites for subsequent evaluation.

SUMMARY OF THE INVENTION

It is therefore an object of the present invention to systematically check for and retrieve data from a known, public system to a system inside company firewall restraints.

Still another object of the present invention is to access specialized data files, then process and store data in an internal database.

Still another object of the present invention is to allow timely access to acquired stability data and configuration information.

Still another object of the present invention is to function to hold stability information data and to provide this function virtually unattended in a timely manner.

Still another object of the present invention is to provide a secure method for accumulating customer data for subsequent evaluation.

The present method provides a means for retrieving stability data from a non-secure site to a secure site. This data is then deposited into a central repository for the purpose of providing a central Unisys engineering group with a means to measure system stability and availability. This method provides a piece of an Availability Monitor system that will ultimately be used to detect potential hardware and software problems in an attempt to support the customer thereby adding integrity to the system.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY ITEMS

Figure 1:
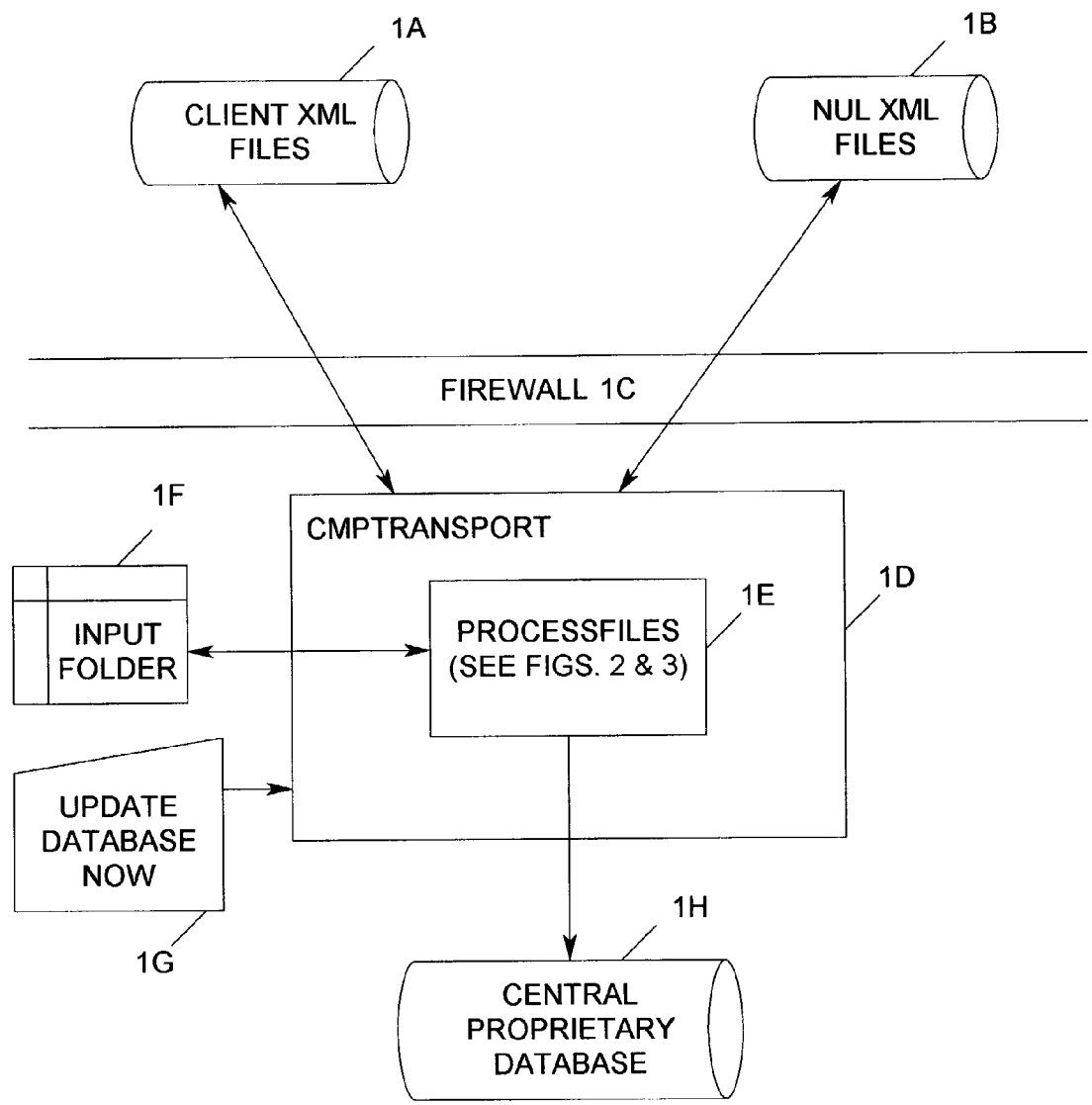
FIG. 1 is a diagram that shows an overview of the CMPTRANSPORT.

1. Sentinel: The umbrella software package that contains Unisys value added software for the ES7000 systems; including our Availability Monitor.
2. Event Log: A Microsoft Windows repository of critical and non-critical information pertaining to the system and applications. The Availability Monitor reads the both System and Application event logs to collect pertinent information for determining system availability.
3. XML files: Extensible Markup Language, or XML, files are the means whereas the Availability Monitor system transports structured data between the customer's and Unisys systems through the internet.

4. Firewall: A set of programs residing on a "gateway server" that protect the resources of an internal network. A security system to protect a networked server or computer from intentional or accidental damage or unauthorized access; implemented by either hardware (a dedicated gateway machine) or software (defensive coding).
5. Availability: The percentage of a given time interval in which, a system is considered up and running.
6. Availability Monitor: A Unisys software program that collects customer availability and stability information and transports it to a central engineering group at Unisys for system stability analysis.
7. CMP (Cellular Multi-Processor) Collector (aka Availability Monitor): CMP Collector is an earlier name for the software program 'Availability Monitor'.
8. Customer Configuration: Within the Availability Monitor program, the customer is required to define its configuration of ES7000 systems and their subsequent Service Processor(s) and Partition(s). This configuration definition is then stored in a local database and is used within the program to determine which entities are available for the collection of stability information.
9. IMS (Integrated Maintenance System): Now referred to as Server Control. The purpose of IMS is to provide hardware and partition management for Unisys CMP Systems.
10. System Registry: A repository on Microsoft Windows systems containing information about a computer's configuration. The registry is organized hierarchically as a tree and is made up of keys and their sub keys and value entries. The registry is available for application programs such as the Availability Monitor to hold pertinent information about a user or machine profile so that it can be referenced on separate instantiations of the program.
11. Coupled Help: An application display technique in which help information is displayed in a window that exists separately from the main application, but is physically located immediately adjacent to it. If the user repositions the main application window and re-launches the coupled help, the help window will automatically reposition itself relative to the application window.
12. Help Window: An application window in which help information is displayed. The application window is a typical Microsoft Windows style dialog that is commonly used in graphic user interfaces.
13. Scan Event Logs: A process of steps which reads the Windows System and Application Event Logs on a service processor or partition, then, stores event information from these logs that is pertinent to determining system stability and availability into a local Microsoft Access database. The Availability Monitor program periodically runs this process on each accessible Service Processor or partition in the customer's configuration to collect stability data from each of the logs.
14. Last Scan Timestamp: A time and date property of a partition that exists in the PartitionInformation table of the Availability Monitor program's database. This timestamp depicts the time/date in which Availability Monitor last scanned the event logs on a particular partition or service processor.
15. Class Module: A program object within Availability Monitor that holds and filters pertinent stability event information that is read from Windows System or Application Event logs before storing it into a local Microsoft Access database.
16. Scan Criteria: In the Availability Monitor program, the criteria required to the scan event logs on a server. This scan criteria involves the IP address, operating system, and usercode and password, if required, of a server.
17. System Event log: A type of Windows Event Log that holds events logged by the system. These events could contain information about hardware, software, or system problems. Each event in the log contains the following fields include: Type, date, time, source, category, event, user, computer, and description.
18. Application Event Log: A type of Windows Event Log which holds events logged by applications or programs on the system. It may contain messages, errors, warnings, and other information written to the log by applications. The application developer decides which events to record and what information to include in the various fields of the log. These fields include: Type, date, time, source, category, event, user, computer, and description.
19. PartitionInformation Table: A table in the Availability Monitor's local database that contains information about a partition or service processor within the customer's configuration. The information stored in this table consists of the following:
The system that the partition is associated with:
The running operating system
Whether the partition is currently marked to be scanned
The partition's name
The real computer name or IP Address of the partition
Whether it requires a log in
A usercode to log in with
A password to log in with
Whether it is a Service Processor or not
The timestamp of the latest event read
The timestamp of the last Scan Event Log
The timestamp of the last stability data transport to a central engineering group
20. Event ID: An ID to indicate what type of event was read from either the Windows System or Application Event log. This ID is assigned by Availability Monitor when placed into the local database and is not necessarily the event ID from the Windows Event Log.
21. Voyager Partition: A CMP Server partition running the OS2200 operating system of Unisys Corporation.
22. ClearPath Partition: A CMP Server partition running the A-Series MCP operating system.
23. MIP Application Log: See Application Event Log.
24. CMP Server: A Cellular Network Multi-Processor (CMP) Server is an enterprise network server used for large-scale processing.
25. Partition: An independent operating system (OS) instance of a CMP Server.
26. Local Access Database: See Microsoft Access Database
27. Windows: A multi-tasking, multi-threaded operating system developed by Microsoft Corporation.
28. Windows based system: A system running the Windows operating system developed by Microsoft Corporation.
29. LAN Modem: A modem that enables a LAN to share Internet access over a 56K analog phone line.
30. Dial Modem: Acronym for modulator-demodulator, a modem is a device that enables a computer to transmit data over telephone lines. A dial modem has the capability to dial a phone number.
31. Retry Count: Within the Availability Monitor, the number of attempts made to establish a communication connection via LAN Modem or Dial Modem before giving up and returning an error.
32. CMP Transport (aka Availability Transport): A program installed on a Unisys server that parses the XML Files sent by the Availability Monitor at various customer sites and stores the data in a central SQL Server or Microsoft Access database.

33. XML File data: The data stored within an XML file and which is parsed by the CMP Transport program. The data contains configuration and stability information gleaned from a customer's CMP Server by the Availability Monitor program.

34. CMP Reporter: A program that organizes and generates stability data reports about running CMP Servers. The CMP Reporter accesses the central SQL Server or Microsoft Access database wherein the CMP Transport has previously stored customer stability data read from XML files sent by the Availability Monitor.

35. Opening DB: A procedure that connects the program to a database.

36. Tree/List Views: Within the CMP Reporter program, the tree view displays show customers, systems, and partitions that exist in a central database. The list view displays partition information about partitions that run under a selected CMP Server.

37. Customer/System Charts: Two types of report charts generated by CMP Reporter. Report charts can either be grouped by customers, including all their systems, or a single system.

38. MTBX: The Mean Time Between (MTB) events is the quotient of a time interval and the number of specific events that occurred inside that time interval.

39. Availability: The percentage of a given time interval in which, a system is considered up and running.

40. Stability Information (Stability Data): Information about a system that reflects some aspect of the system's availability and reliability. This information includes planned and unplanned system stops, system starts, and a variety of system errors.

41. Microsoft Access Database: A Microsoft created database which contains a collection of information related to a particular subject or purpose. The database is created and maintained at the client site. It is used to store information, which is gathered from one or more client systems. This information is periodically sent to Unisys central engineering.

42. Configuration Information: Information about the levels and settings of various software and hardware components of a partition.

43. Event Logs: Logs that are maintained on a Windows operating system. They contain messages, errors, warnings, and other information written to the log by applications or system components. There are three types of event logs—Application, System, and Security. Each event in the log may contain the following information: Type, date, time, source, category, event, user, computer, and description.

44. Service Processor: aka MIP. A workstation that serves as the console for a CMP Server.

45. Partition Configuration: See Configuration Information

46. Plateau Levels: The release level of a set of software and hardware files (known as a Plateau), which is run on the Service Processor of a CMP Server.

47. Operating System Information: Details about the operating system as recorded in the Windows registry. This includes the version, build number, name, type, and install date of the operating system.

48. Directory System Information: Details about the names of critical directory paths of a system as recorded in the Windows registry. This includes the Windows, system, and boot directories.

49. BIOS Information: Information about the basic input/output sub-system (BIOS) of a system as recorded in the Windows registry. This information includes the Date and Version of the BIOS.

50. Network Card Descriptions: A description of the network card(s) installed on a system as recorded in the Windows registry.

51. Hot Fix Information: A list of hot fix identifiers installed on a partition as recorded in the Windows registry. A hot fix is a fix provided by Microsoft to address a specific critical problem in the operating system software.

52. Event Information: Each event in an event log may contain the following information: Type, date, time, source, category, event, user, computer, and description.

53. FRU (Field Replacement Unit): The lowest level hardware component of a partition, which can be replaced/swapped out.

54. Registry Entries: Information stored in a database repository on a Windows system, known as the "Registry." The registry contains information that is continually referenced by the operating system and installed applications such as program information, property settings, and hardware descriptions.

55. Help Wizard: A Wizard is an application that walks a user through a multi-step process by displaying a sequence of windows or dialog boxes that either instruct the user, request information from the user, or inform the user of what operations are being performed.

56. Coupled HTML Help: A method for displaying an HTML Help window. This method attaches a window dedicated solely to display help information to the main application window. The Coupling of the windows refers to the fact that the help window will dynamically reposition itself on the screen so that it maintains its defined spatial relationship with the main window.

57. Multi-pane Dialog: The Availability Monitor uses a multi-pane or tri-pane dialog to display help menu contents. The following panes are included in the dialog:
   1. Toolbar Pane. This contains and manages the toolbar buttons. It is capable of sending notifications to the owner when buttons are pressed.
   2. Navigation Pane. This contains the ActiveX control that supports the Table of Contents, the Index, the Search dialog, and other features.
   3. Topic Pane. This displays HTML text and manages hyperlink navigation.

58. .chm file: Compiled HTML Help File. A file used by the coupled help. It is essentially a collection of HTML documents and all support files (such as images or sounds) that are used in the display of help. The HTML files contain all of the text that will be displayed in the help window, along with links to other documents and pictures.

59. Sequel Server: Microsoft® SQL Server™ is a relational database management and analysis system. The SQL Server database employed in the Availability Monitor software is used to house a central database within Unisys. This database is used to store availability information from multiple client sites from around the world. This database is used to generate reports on the availability of the various client sites.

61. Hardware Inventory: A list of hardware components of a system.

62. Find Option: A feature in the CMP Reporter program that will help a user search for customers, systems, or partitions in the Tree View display.

63. BSOD (Blue Screen of Death): A commonly used acronym used to represent an error condition in Windows wherein the user's screen displays a blue background with white lettering. The nature of the error can vary, but it is typically a fatal error requiring a system restart or reboot.

64. Dr. Watson error: The information obtained and logged by Dr. Watson is the information needed by technical support groups to diagnose a program error for a computer running Windows 2000. A text file (Drwtsn32.log) is created whenever an error is detected, and can be delivered to support personnel by whatever method they prefer.

66. VME (Virtual Memory Error): An error that occurs when the operating system is unable to properly manage virtual memory for any number of reasons. Typically, a VME is reported when a system either runs out of Virtual Memory, or runs so low that the normal operation of one or more applications is in jeopardy.

67. Chkdsk: A Microsoft application that traditionally runs on a system after an improper shutdown. Chkdsk does both a physical scan of the hard drive, and a logical scan to ensure data integrity. Chkdsk also verifies other properties of the hard drive during its operation. Availability Monitor tracks Chkdsk executions since they relate to system stability.

68. Raw Availability: The calculation of availability based on all possible types of downtime.

69. Agreed Availability: The calculation of availability based on a subset of possible types of downtime, which are agreed upon by the service provider and the customer.

70. Task Scheduler: A Microsoft tool used to schedule tasks for recurring, automatic execution.

71. EventLogData Table: The EventLogData table is a table in the local database. It contains the following fields: PartitionNumber, SystemNumber, Event_ID, Event_Time, and Event_Description.

72. Tool Command Language (TCL): The TCL scripting language is used by Unisys to read and write to low level hardware units that are unreachable through other interfaces. The TCL script in this product is used to generate a list of the system's hardware inventory.

73. MIP (Management Interface Processor): See Service Processor. (Item #44).

74. Internal Data Store: This is data, which is stored internally in the program. It can take many forms from arrays, tables, or collections to name a few. It is temporary to the execution of the program. This is in contrast to "external" stores such as an Access database, where the data is stored external from the program and persists throughout multiple executions of a program.

75. Non-Fatal Dump: This dump is typically initiated by a user or program to force a dump of memory contents for some analytical purpose. The system continues to run after the dump is taken.

76. Fatal Dump: A fatal dump is part of an unexpected system failure. In this case a dump is initiated in the process of the system going down. The system must be restarted to recover from the failure. The dump can be used to determine the cause of the failure.

77. Unplanned Stop: An unplanned stop is a stop of the system, which the user has no control over. This could be due to a fatal program error, or the installation of a product, which requires a restart of the system.

78. Planned Haltload: A planned haltload is one which is purposefully initiated by the user.

79. Unplanned Haltload: An unplanned haltload is forced due to program error or the installation of software, which requires a restart of the system.

80. Clean Shutdown Event: A purposeful stop of the system by a user which brings down the system in an orderly manner.

81. SDS (System Data Set): The SDS contains hardware unit Tcl, unit version info, BIOS images, etc. Different levels of SDS can be installed on a given system. On older systems there is one SDS for the system, newer systems support system and partition SDS.

82. HAL (Hardware Abstraction Layer): A well-defined software interface that allows an operating system to communicate with diverse hardware architectures.

83. Client XML Files: Files in XML format, sent from a customer's ES7000 systems (Cellular Multi-Processor).

84. NUL XML Files: Files, in XML format that are forwarded by NUL (Nippon Unisys Limited) on behalf of their ES7000 customers.

85. NUL (Nippon Unisys Limited) Environment: An environment that contains an operational set of Availability Monitor product, CMPTransport, and CMPReporter. As they collect data and update their database, the XML files collected from their client base are forwarded to a Unisys operating environment.

86. Archives: A folder on the server running CMPTransport where XML files are stored after being processed.

87. Defined Input Folder: The folder on the CMPTransport server where XML files are temporarily stored after importing them from across the firewall. This is the folder from which the XML files will be accessed as they are processed.

88. Server Box: This is checkbox reference to an external server where XML files will be taken from and pulled through the firewall and into the "defined input folder".

89. External Server: This is a server outside the Unisys Internet firewall that holds Availability Monitor created XML files.

90. Proxy: The proxy server is an intermediary that handles all communication between the NUL environment and Unisys. This serves as a firewall preventing direct communication to and from the NUL environment.

91. Proxy Server Password: The password required to connect to the proxy server.

92. Express Server: Where XML files are collected from NUL. This is the only UNISYS environment that NUL is permitted to access (See FIG. 1B).

93. IP (Internet Protocol) Address: This Address is a unique identifier for a node or host connection on an IP network.

94. Tally Field: A pseudo checksum that ensures the integrity of the data contained in the XML file.

95. Exception Log Table: A table in the database where a client's exception information is stored.

96. Exception Log Information: Information describing errors or abnormal situations encountered while Availability Monitor is running.

97. System Information Table: A table in the Unisys proprietary database that contains information about a system within the customer's configuration. The information stored in this table consists of the following:
  a) The customer ID of the system;
  b) The customer name of the system;
  c) The customer address of the system;
  d) The contact name of the system;
  e) The contact e-mail address of the system;
  f) The contact phone numbers of the system;
  g) The Unisys contact of the system;
  h) The friendly name of the system;
  i) The type of the system;
  j) The serial number of the system;
  k) The displacement from GMT in minutes to normalize log timestamps;
  l) The classification.

98. Partition Information Table: A table in the Unisys proprietary database that contains information about a partition or service processor within the customer's configuration. The information stored in this table consists of the following:
   a) The system that the partition is associated with.
   b) The running operating system.
   c) Whether the partition is currently marked to be scanned.
   d) The partition's name.
   e) The real computer name or IP Address of the partition.
   f) Whether it is a Service Processor or not.
   g) The timestamp of the latest System Log event read.
   h) The timestamp of the latest Application Log event read.
   h) The timestamp of the last a scan was taken.
   i) The timestamp of the last stability data transport to a central engineering group.
   j) The timestamp of the last configuration information seen.
   k) The classification.
   l) Whether Shutdown Tracker is running.
   m) The timestamp of the first Shutdown Tracker event.
   n) The timestamp of the first event entry.
99. System Configuration Table: Configuration information retrieved through WMI (i.e. An Operating System running on the system).
100. Configuration Information: A table in the Unisys proprietary database that contains configuration information about a partition or service processor retrieved through WMI. The information stored in this table consists of the following:
   a) The system that the partition is associated with.
   b) The configuration item.
   c) The configuration value.
101. UPDATEHWINVENTORYTABLE: This is a procedure call to update the HardwareInventory table in the Unisys proprietary database with hardware inventory data contained in the XML. This data is gathered by calling a TCL script on the customer's system.
102. Remote Server: A server collecting XML files sent by clients.
103. CMP Transport Screen: The main screen that controls the execution of CMPTransport.

Figure 12:
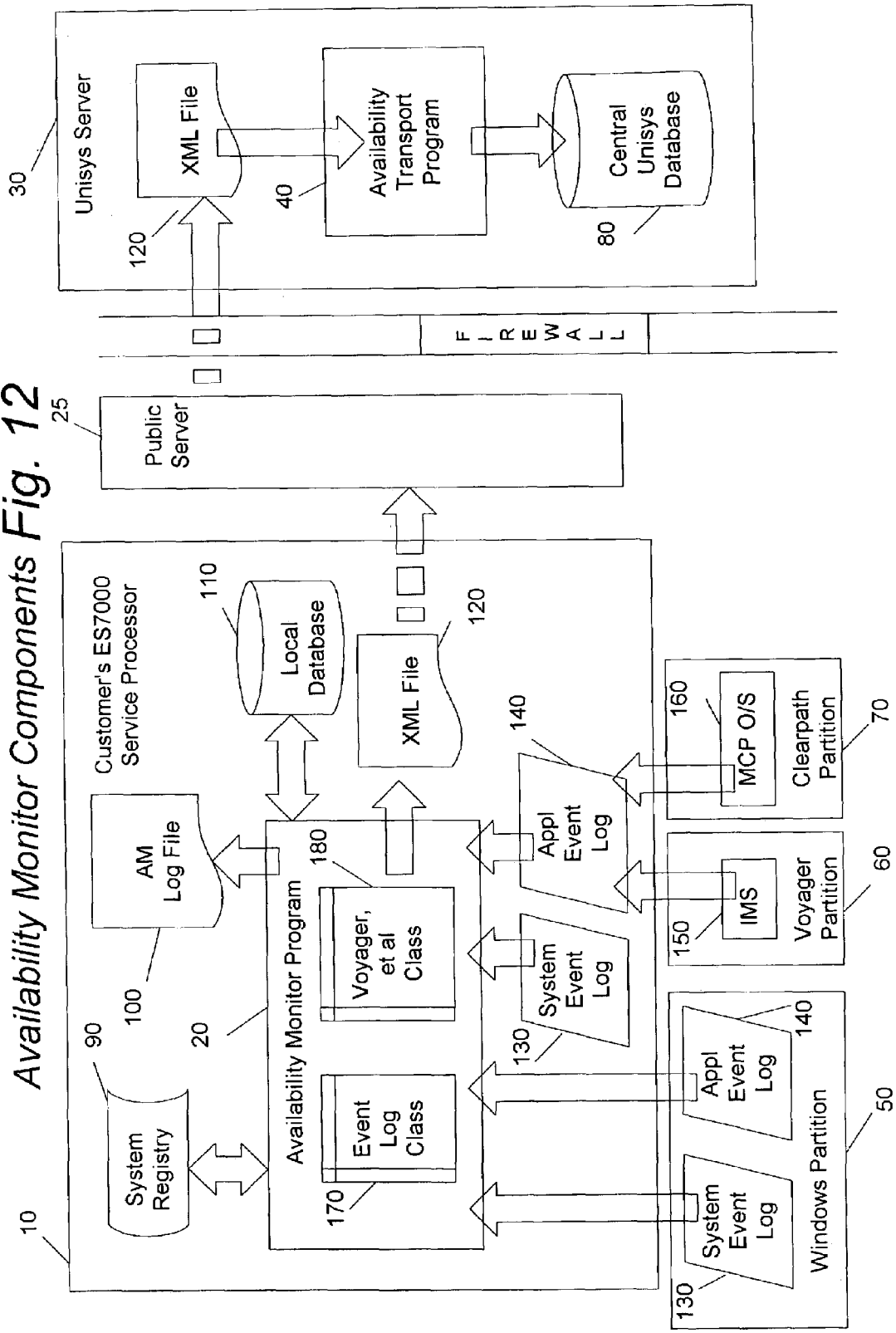
FIG. 12 is an overall drawing of the modular environment in which the Availability Monitor and CMPTransport programs operate.

General Overview:

FIG. 12 is a diagram illustrating the components, which utilize the Availability Monitor program 20. The Availability Monitor Program (20) is installed on a customer's ES7000 service processor (10). The Availability Monitor program (20) scans the Service Processor System Event Log (130) and Application Event Log (140) searching for information relative to the system's stability. This stability information is interpreted and stored in a local stability database (110) that also resides on the customer's ES7000 Service Processor (10) and is periodically written to an XML file. This XML File (120) is then transported to a public server and fetched from across the firewall to a private secure server by the Availability Monitor Transport program (40) and subsequently stored in a central Unisys database (80). From this location, Unisys executives and engineers can extricate reports on the information therein to proactively view each customer's system availability.

This method focuses specifically on gathering the XML files from one of 2 public non-secure servers to a secure private server and then processing the data to store into a central Unisys database (80).

Figure 13:
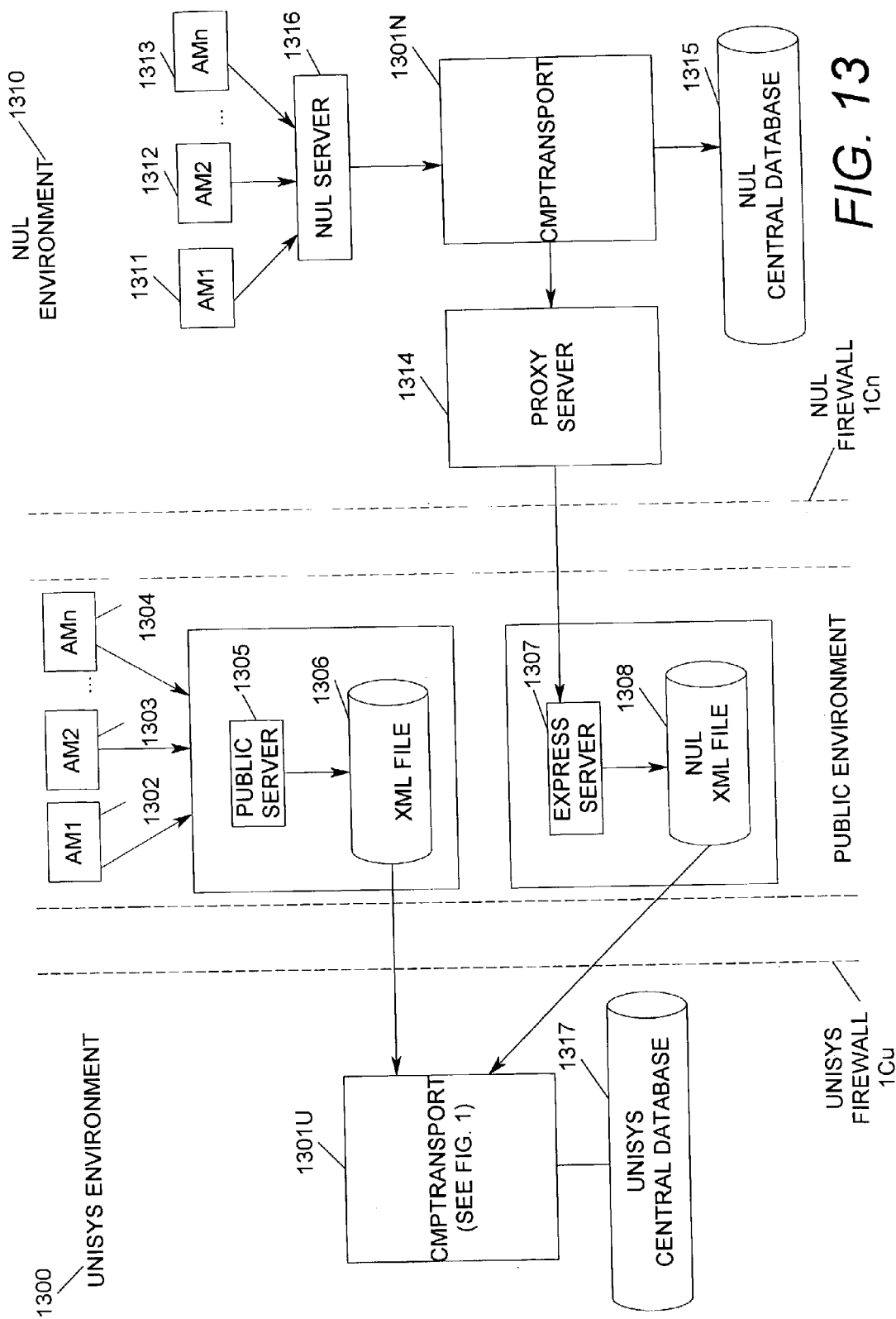
FIG. 13 is an overall drawing of the relationship between public and secure environments and the transporting of XML files between NUL and Unisys proprietary servers each running the CMPTransport program.

FIG. 13 is a diagram illustrating the components used when transferring data to the Unisys environment from a number of Availability Monitor Programs operating in the NUL (items 1311, 1312, 1313) and Public (items 1302, 1303, 1304) environments. Within the NUL environment (item 1310) Availability Monitor Programs send data to a NUL server which collects and stores this data for subsequent retrieval by the CMPTRANSPORT in the NUL environment. The NUL CMPTRANSPORT program retrieves this data from the NUL server (item 1316) and updates a NUL Central Database (item 1315) and at the same time sends this data to the Express server (item 1307) via a proxy server (item 1314). The purpose of the proxy sever (item 1314) is to act as a gateway though the NUL firewall 1Cn to the express server (item 1307).

Within the Unisys environment CMPTRANSPORT (item 1301U) pulls data from the public server (item 1305) and express server (item 1307) and updates the central Unisys database (item 1307). The NUL environment cannot directly communicate with the Unisys environment, and therefore must pass data through the public environment first. The proxy server 1314 is what makes the connection from the NUL environment to the Unisys controlled environment possible.

Previous methods for transporting proprietary information of any type from customers to a central site maintained by another company for support and similar purposes were prone to breaches of system security, were cumbersome, or were too costly in the utilization of processor resources. A means was necessary for multiple customers to be able to send data to one site without any possibility that anyone else—including other customers who are also sending data to that site—could accidentally or deliberately access that information. Moreover, a means was necessary to provide a mechanism whereby data could be swiftly retrieved from a known public location into an internal, secure system-operating environment in a regular and timely manner without using excessive system resources. To protect the customers as well as the company providing the service, it was crucial to restrict access both to the known public location and to the internal location.

The current method is able to systematically check for and retrieve data from a known, public system to a system inside company firewalls. This data is processed and stored into an internal database for the express purpose of allowing timely access to stability and configuration information for support personnel or managers within the company. The method is capable of functioning virtually unattended once initial setup is complete.

The current method prevents access to the files that other customers have transmitted by providing all users with user codes that permit only write access. This prevents external users from accessing or even listing the contents of the common folder into which all files are sent for processing.

The program CMPTransport is automatically initiated when new files appear in the input folder. CMPTransport copies files from the input folder and updates the central database with their contents. After files have been read, they are moved to an archive folder if they were successfully processed, or they are moved to an errors folder for later analysis if there are problems with the files.

This method further describes the gathering of stability data from both an NUL proprietary environment and a Unisys proprietary environment. Both environments perform the function of collecting stability and configuration data from systems and partitions and packaging it within an XML file.

In the NUL environment, this information in the XML file is first transported by NUL customers' Availability Monitor programs to an NUL public server. The CMPTransport within this proprietary NUL environment imports the XML files and then exports these files across an NUL firewall via a proxy server to a public Express Server that is readily accessible by the Unisys proprietary CMPTransport.

Within the Unisys environment, the XML file information is transported to a public Unisys Server. The CMPTransport in this environment imports XML files from both the Unisys public server and the Express server. CMPTransport then processes the information by reading the XML files and storing them into a central database on a private secure Unisys server for subsequent executive reports.

DESCRIPTION OF PREFERRED EMBODIMENT

Referring now to the drawings, and FIG. 1 in particular. CMPTransport 1D is a program that runs in a secure environment within a proprietary firewall 1C. It imports files from across this firewall from servers where they are collected as referenced by file items 1A and 1B, respectively shown as Client XML files and NUL XML files. These files are placed in a temporary input folder referenced by item 1F for subsequent processing by the PROCESSFILES function, 1E, which is the procedure within CMPTransport, item 1D. The program 1D is initiated through a command "Update Database Now" 1G, at which time all the files are pulled in from the input folder 1F, and then output to a central proprietary database (item 1H), which is accessible only to the people within the proprietary environment. There are two versions of the CMPTransport, 1D, one that runs within the proprietary environment, and the second, which runs on the NUL environment. When run in the NUL environment, the files are output to the NUL XML file folder, 1B, which are then accessible by the proprietary environment.

Figure 2:
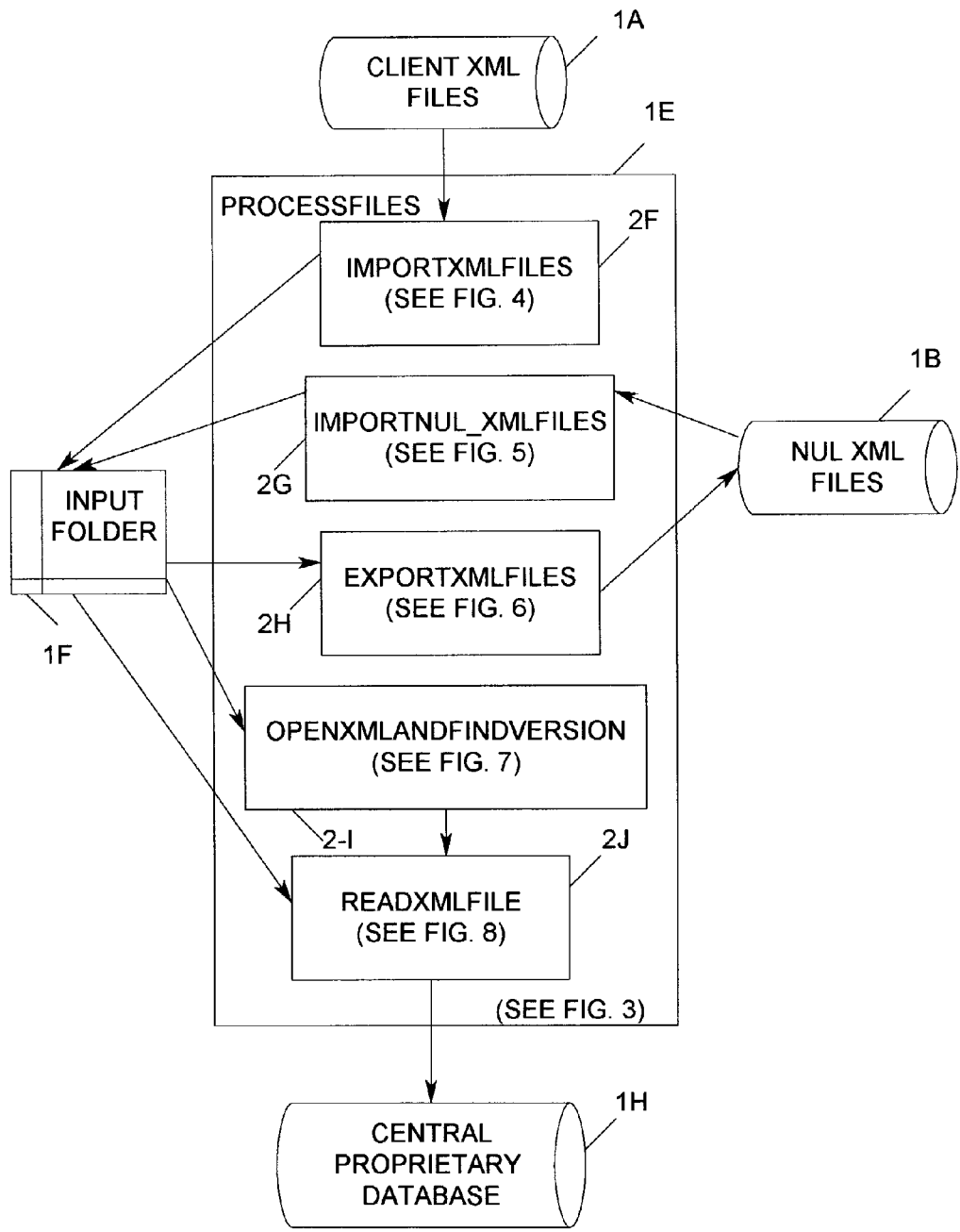
FIG. 2 is a diagram that illustrates the dataflow of processing files.

Referring now to FIG. 2, which is a diagram that illustrates the data flow of the PROCESSFILES function, 1E. PROCESSFILES, 1E, is the main procedure within CMPTransport 1D that handles the importing of client XML files (item 1A), and subsequently writes them to the central proprietary Database (item 1H). Procedure IMPORTXMLFILES (item 2F) reads all the files across the firewall 1C from the storage unit where the client XML files 1A are stored, and outputs them to an input folder (item 1F) for subsequent processing. If the system is running in the proprietary environment, the procedure IMPORTNUL_XMLFILES is executed (item 2G), which reads in the NUL XML files (item 1B) and outputs those files into the input folder (item 1F). When running in the NUL environment, all the files accumulated in the input folder (item 1F) are read in by the EXPORTXMLFILES procedure (item 2H), and output to the NUL XML server files (item 1B) for subsequent import by the proprietary environment. After all the files are accumulated in the input folder (item 1F), the OPENXMLANDFINDVERSION (item 2I) opens each individual XML file, and verifies if it's a valid XML file, and allows continuation by READXMLFILE (item 2J). READXMLFILE reads each individual XML file from the input folder (item 1F) and processes it and stores it in the central proprietary database (item 1H).

FIGS. 3A, 3B, 3C, and 3D illustrate the procedure for PROCESSFILES, which describes how XML files are accessed and processed.

Figure 3A:
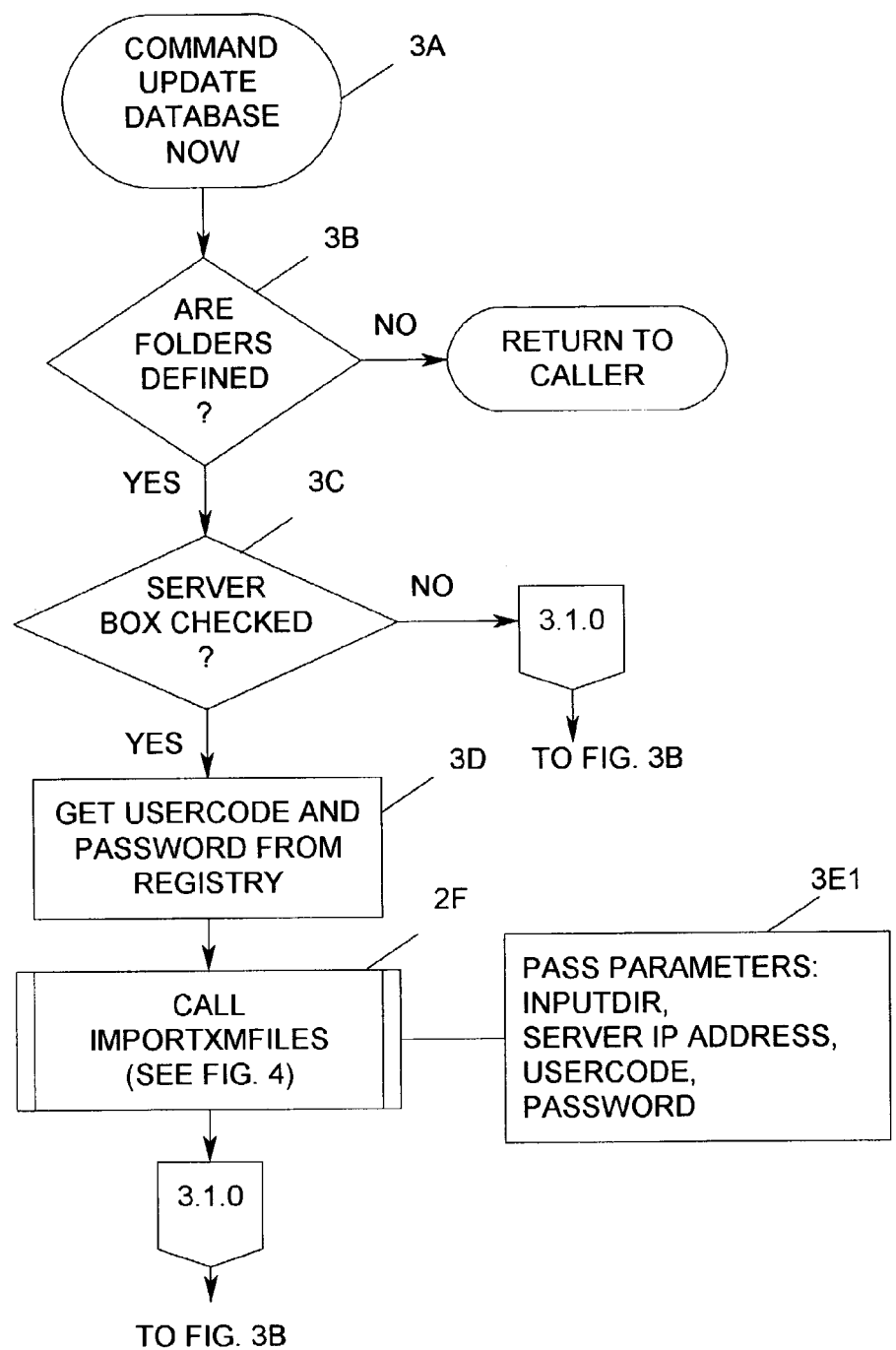
FIGS. 3A, 3B, 3C, and 3D illustrate the procedure for processing files.

Now referring to FIG. 3A, which begins when PROCESSFILES (item 1E) is initiated by the command "Update Database Now" in item 3A. Next there is a check made as to whether or not there are input folders for both the archive and the defined input folder (item 3B). If the answer to 3B is no, processing cannot be taken any further, and the processing returns to the caller. If the folders are defined, item 3C asks if the Server Box option (item 11A) is checked. The Server Box option (item 11A) will indicate whether files are to be imported across the firewall from an external server. If the answer to 3C is no, the program proceeds to FIG. 3B. If the answer to 3C is yes the user code and password are obtained from the system registry (item 3D). Next, the program will call IMPORTXMLFILES (item 2F) passing the parameters input directory, the server IP address, the user code, and the password. The procedure IMPORTXMLFILES is used to copy files across the firewall from the various servers. The sequence after step 2F continues to FIG. 3B.

Figure 3B:
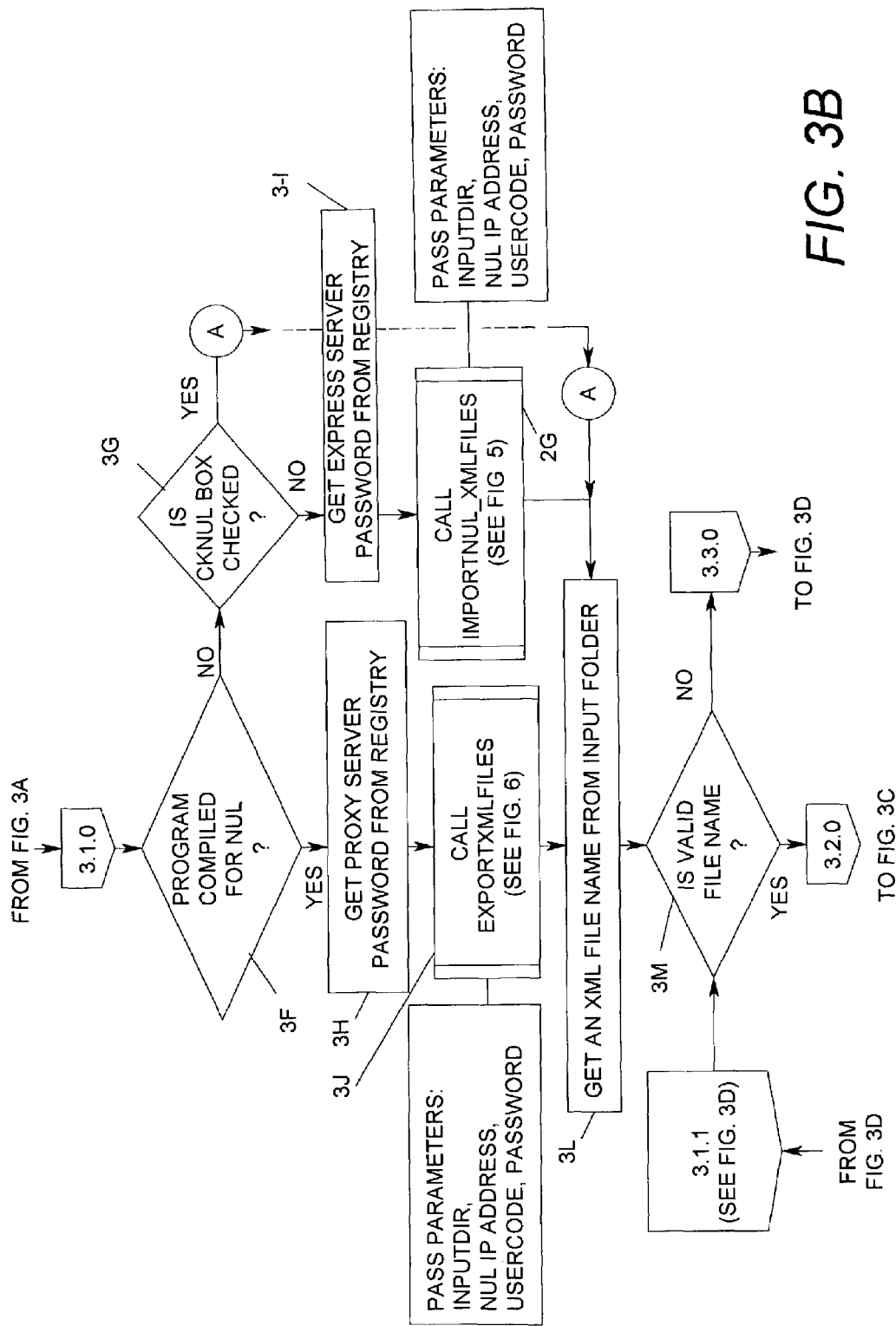

Now referring to FIG. 3B, which begins with an inquiry to check whether or not the program we are running was compiled for execution on an NUL system (item 3F). If the answer to inquiry 3F is yes, a process to get proxy server password from registry is initiated (item 3H). This is a password that NUL uses because they use a proxy server (FIG. 13) for transmitting data to Unisys central engineering. Next, when calling EXPORTXMLFILES (item 3J), the parameters input directory, NUL IP address, usercode, and password are passed. Files collected by NUL are exported to UNISYS central engineering from CMPTransport. The exporting of files, therefore, is important because it is the only way the system has a way of collecting data from NUL. The operating environment is so encapsulated, that it prevents outside access, and therefore to be able to show the desired product, data must be exported. If the answer to inquiry 3F is no, another inquiry is made as to whether or not the CKNUL box (item 11B) has been checked (item 3G). If the answer to inquiry 3G is yes, connector A gets an XML files name from input folder (item 3L). The program will reference this input folder by getting a list of all XML files that are in the input folder for subsequent processing. Next, another inquiry is made (item 3M) as to whether or not the file name in the input folder is valid. If the answer to inquiry 3M is no, the sequence will proceed to FIG. 3D. If the answer to inquiry 3M is yes, one proceeds to FIG. 3C. If the answer to inquiry 3G is no, a process to get the express server (FIG. 13) password from the registry is initiated (item 3I). This is the password that enables one to access the collection point for NUL XML files on the other side of the firewall. Next, the program will call IMPORTNUL_XMLFILES (item 2G) passing the parameters input directory, NUL IP address, usercode, and password which will copy the NUL XML files from the Express Server (FIG. 13).

Figure 3C:
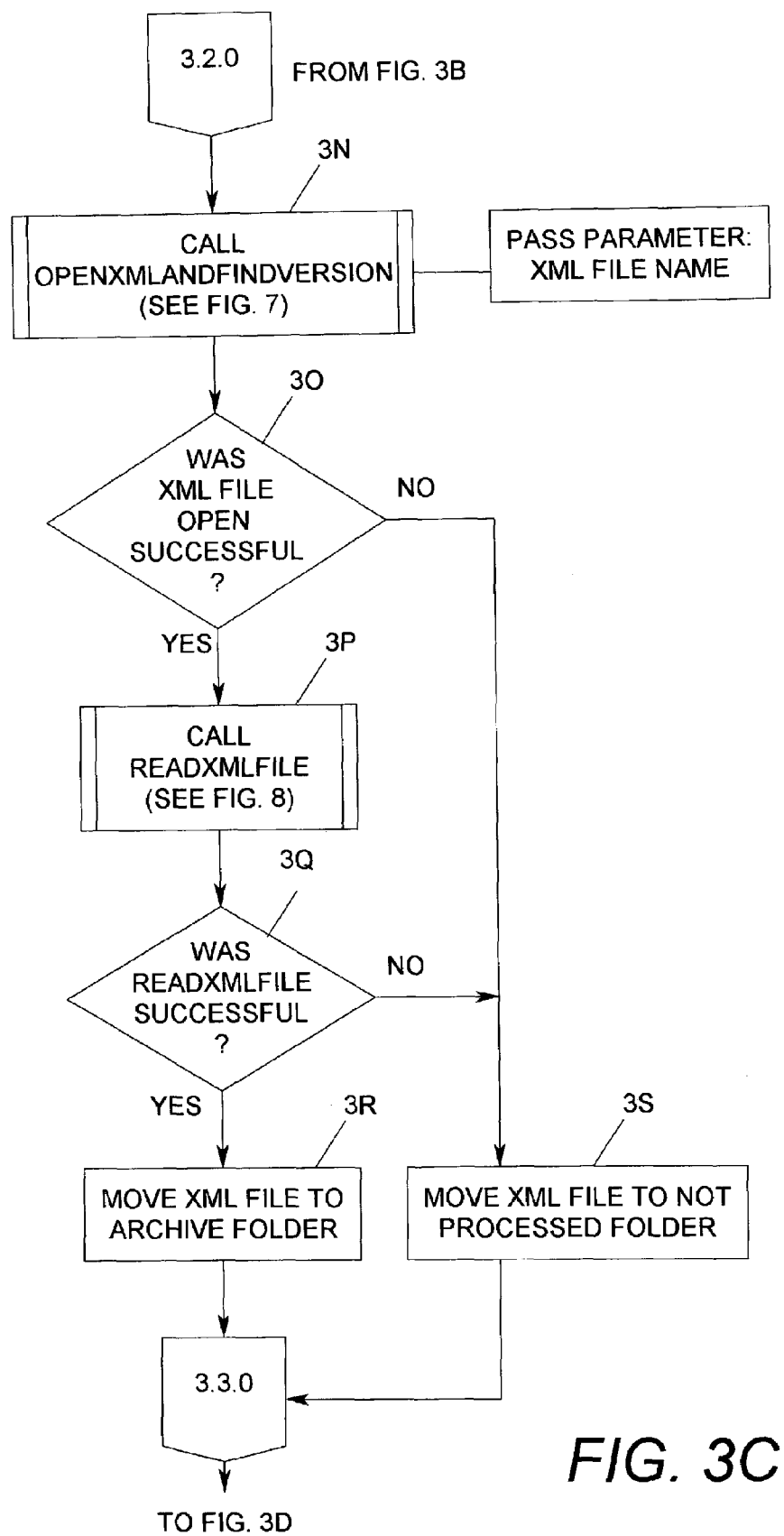

Referring now to FIG. 3C, which begins with a call to OPENXMLANDFINDVERSION (item 3N), which passes the parameter of the XML file name. The file is opened up and items are examined to see if it is a valid version of the file, and that the files have not been processed before. Next, an inquiry is made (item 3O) to check if the XML file open was successful. If the answer to inquiry 3O is no, the XML file is moved to a "not processed" folder (item 3S). If the answer to this inquiry is yes, a call to READXMLFILE is made (item 3P), which reads in the file and processes all the items within the file. READXMLFILE also, at that time, updates the database 1H in FIG. 1. The call to READXMLFILE is illustrated further in FIG. 8.

Next, another inquiry is made (item 3Q) to check if READXMLFILE was successful. If the answer to inquiry 3Q is no, the XML file is moved to a "not processed" folder (item 3S). If the answer to inquiry 3Q was yes, item 3R moves the XML file to the archive folder (item 11D), which has been identified by the user during set up of the program. This is followed by a connection to FIG. 3D.

Figure 3D:
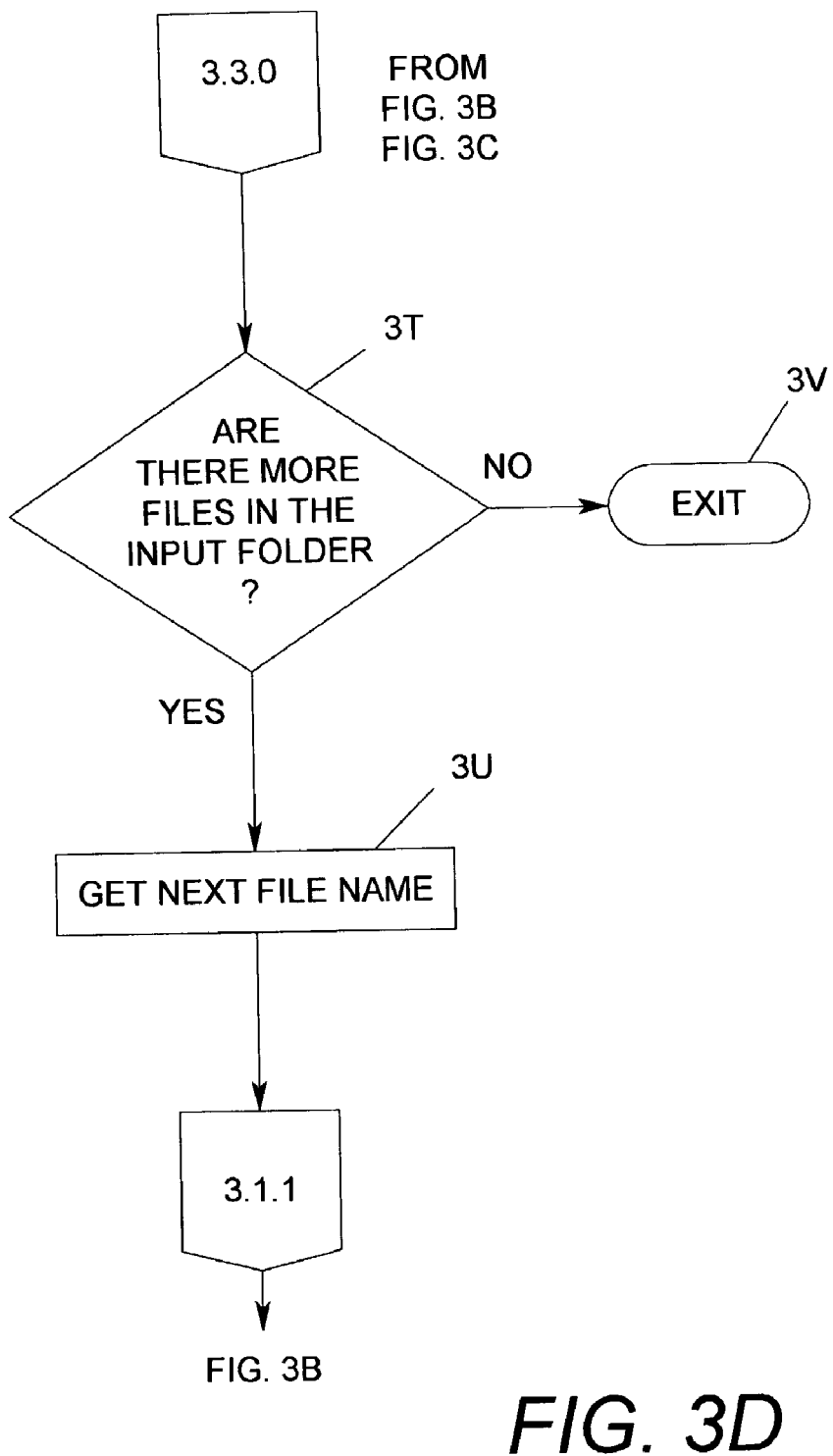

Referring now to FIG. 3D, which begins with an inquiry (item 3T) as to whether there are more files in the input folder 1F. If the answer to inquiry 3T is yes, a process gets the next file name (item 3U), and goes back to the top of the loop via FIG. 3B at item 3M, and continues processing. If the answer to inquiry 3T is no, the procedure exits at item 3V.

Figure 4:
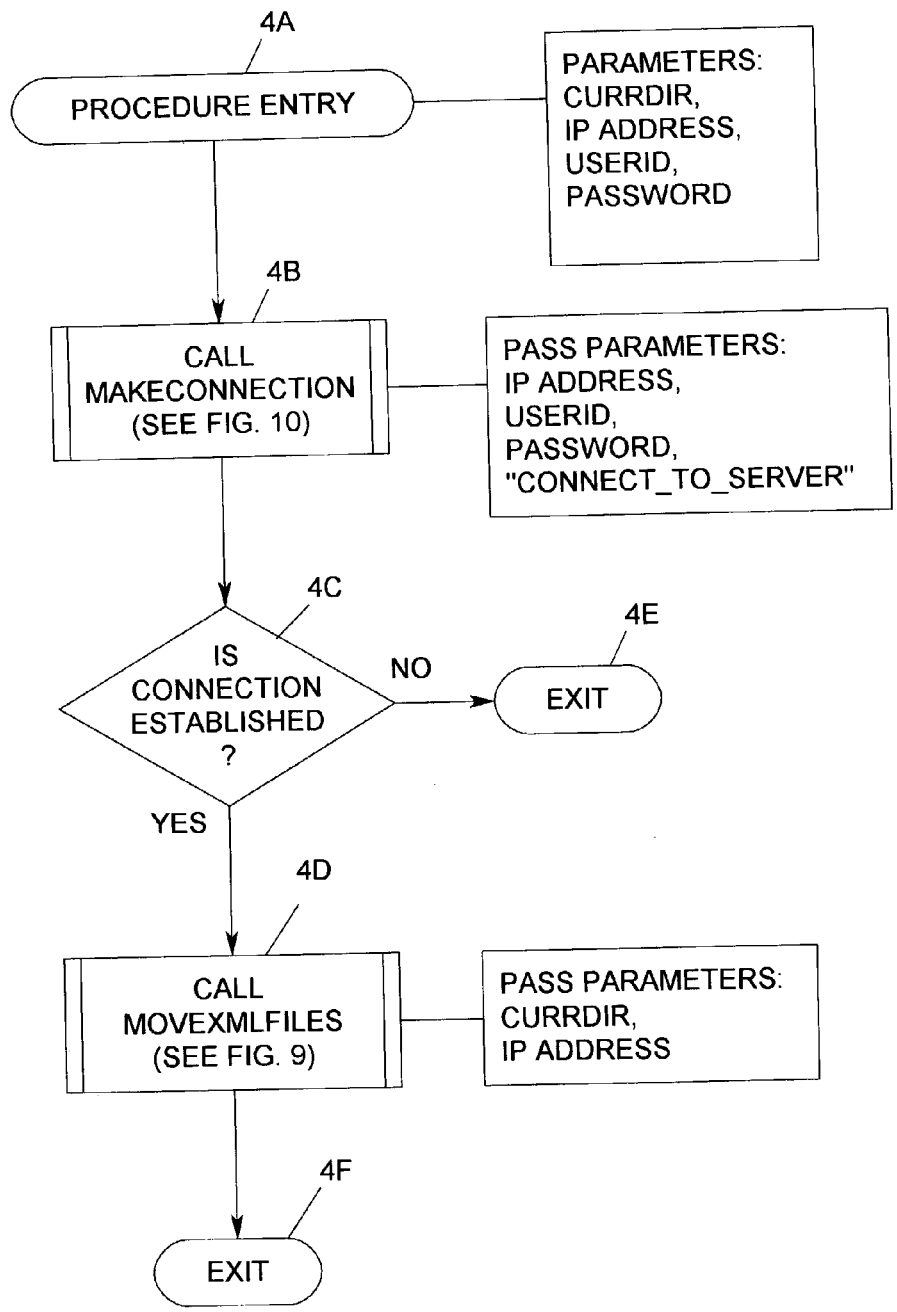
FIG. 4 is a flowchart illustrating the procedure for importing XML files.

Now referring to FIG. 4, which illustrates the process for importing XML files, IMPORTXMLFILES 2F, and begins with a procedure entry point (item 4A), which expects to receive parameters: current directory, IP address, userid, and password. Next a call to a procedure MAKECONNECTION is made (item 4B), which establishes a physical connection to a server that passes the parameters: IP address, userid, password, and a constant "CONNECT_TO_SERVER" for subsequent processing by MAKECONNECTION. Next, an inquiry is made (item 4C) to check if the connection is established. If the connection was not successful (no) in inquiry 4C, the procedure exits at item 4E. If the connection is established successfully (yes) at inquiry 4C, a procedure to call MOVEXMLFILES is initiated (item 4D) passing parameters: current directory and IP address. The call on MOVEXMLFILES moves files from the server on the other side of the firewall into the input folder 1F. The procedure then exits at item 4F.

Figure 5:
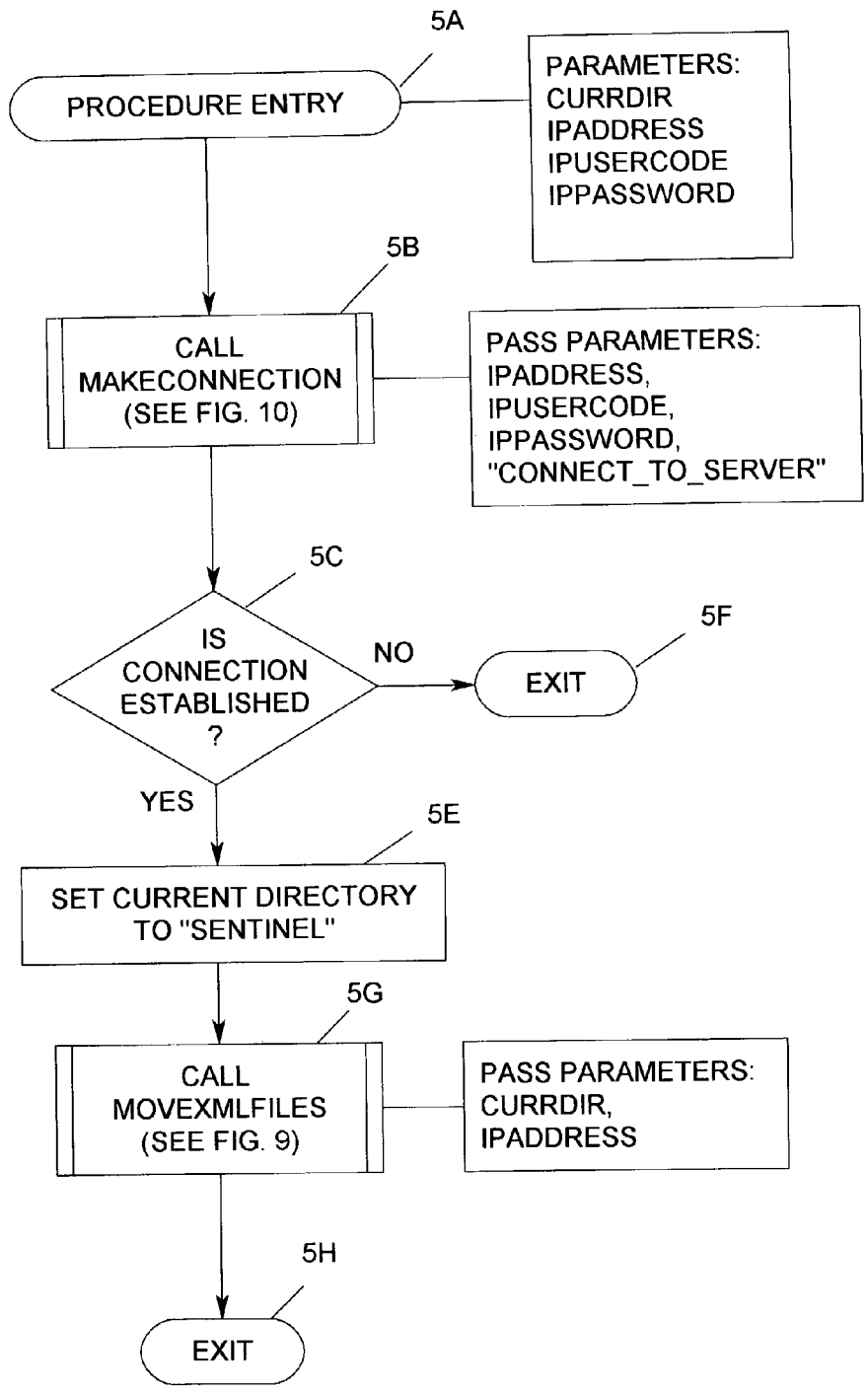
FIG. 5 illustrates the procedure for importing NUL XML files.

Now referring to FIG. 5, which illustrates the process for importing NUL XML files, IMPORTNUL_XMLFILES 2G, this begins with a procedure entry point (item 5A), which expects to receive parameters: current directory, IP address, IP usercode, and IP password. Next, a procedure to call MAKECONNECTION is made (item 5B) that passes the parameters: IP address, IP usercode, IP password, and "CONNECT_TO_SERVER" for subsequent processing by MAKECONNECTION. Then, an inquiry is made (item 5C) to check if the connection is established. If the connection was not successful (no) in inquiry 5C, the procedure exits at item 5F. If the connection established successfully (yes) at inquiry 5C, a procedure to set the current directory to "SENTINEL" is initiated (item 5E). Sentinel is the directory on the Express Server (FIG. 13) where all the XML files from NUL are stored. Next, a procedure to call MOVEXMLFILES is initiated (item 5G), which moves all the files from the server to the input folder and passes the parameters: current directory, and IP address. The process then exits at item 5H.

Figure 6A:
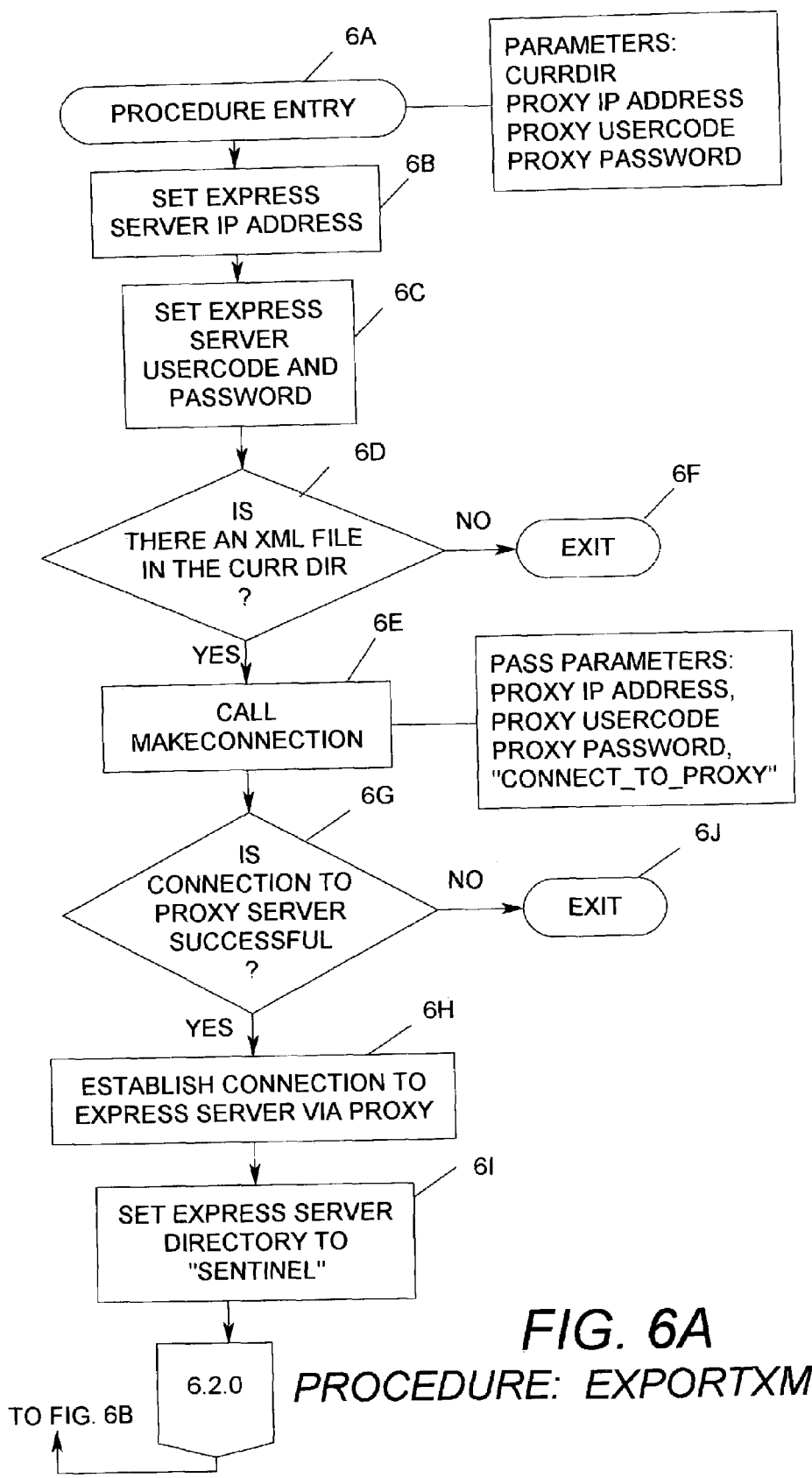
FIGS. 6A and 6B illustrates the procedure for exporting XML files.
Figure 6B:
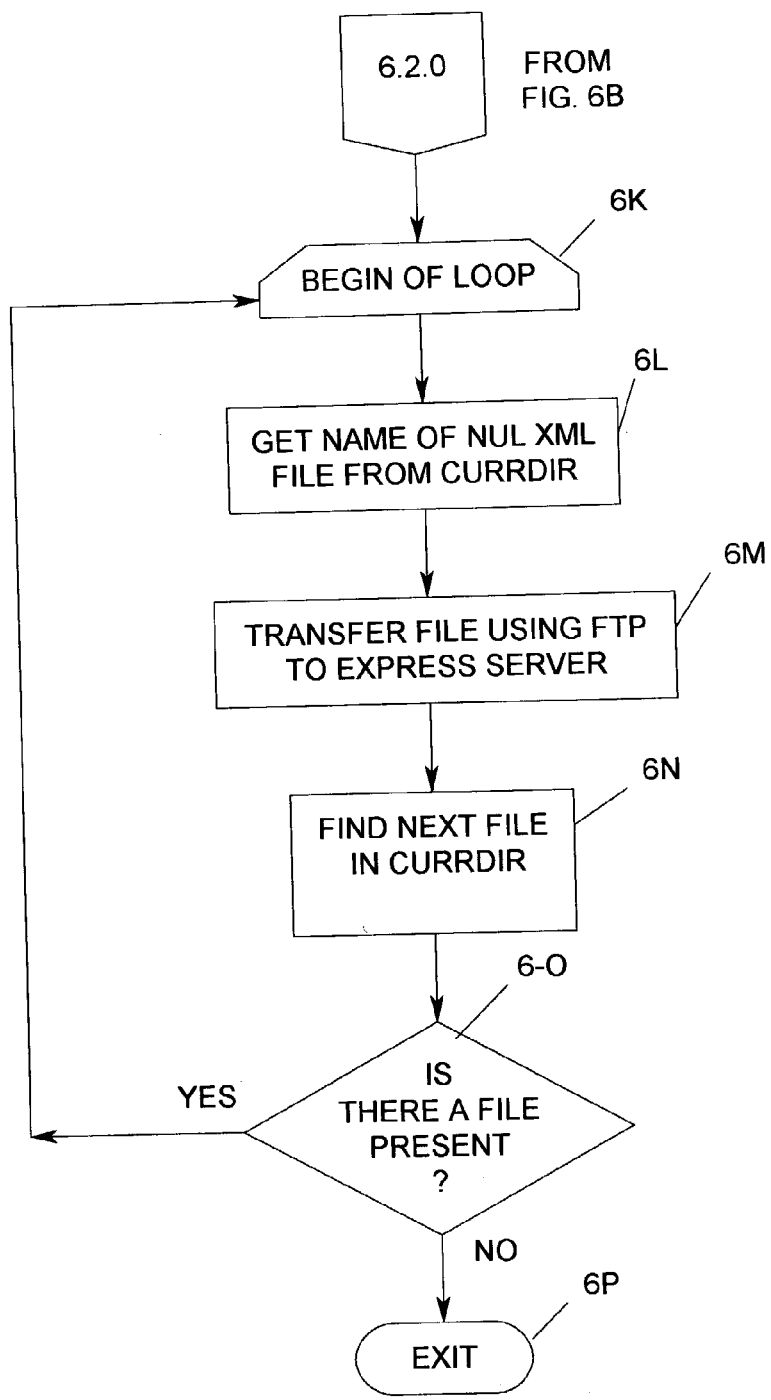

FIGS. 6A, and 6B illustrate the procedure for exporting XML files, EXPORTXMLFILES 2H.

Now referring to FIG. 6A which begins with a procedure entry point (item 6A), which expects to receive the parameters: current directory, PROXY IP address, PROXY usercode, and PROXY password. Next, the Express Server IP address is set (item 6B). Next, the express server usercode and password are set (item 6C). An inquiry is then made (item 6D) to ask if there is an XML file in the current directory. If there are no files in the current directory (no), as asked by inquiry 6D, the process then exits at item 6F. If there is an XML file in the current directory (yes), as asked by inquiry 6D, a procedure to call MAKECONNECTION (item 6E) is initiated, which establishes the physical connection to the express server, and pass the parameters PROXY IP address, PROXY usercode, PROXY password, and "CONNECT_TO_PROXY". Another inquiry is made (item 6G) which examines whether or not the connection to the PROXY server is successful. If the connection to the PROXY server is not successful (no), the process exits at item 6J. If the connection to the PROXY server is successful (yes), a connection to EXPRESS Server via PROXY is established (item 6H). The EXPRESS Server directory is then set to "SENTINEL" (item 6I). This enables us to transfer the files to the SENTINEL directory on the EXPRESS Server. The process is then continued at item 6K in FIG. 6B.

Referring now to FIG. 6B, which begins with a loop (item 6K) that will process all the files that are in the input folder 1F (FIG. 1). A procedure to get the name of the XML file, 1B, from the current directory is then processed (item 6L). The file is then transferred using FTP to the EXPRESS Server (item 6M). The next file in the current directory is then found at item 6N. An inquiry is then made to see if there is a file present in the current directory (item 6O). If there is a file present (yes), the procedure loops back to item 6K, and goes through the process again. If there is not a file in the current directory present, the process exits at item 6P.

Figure 7:
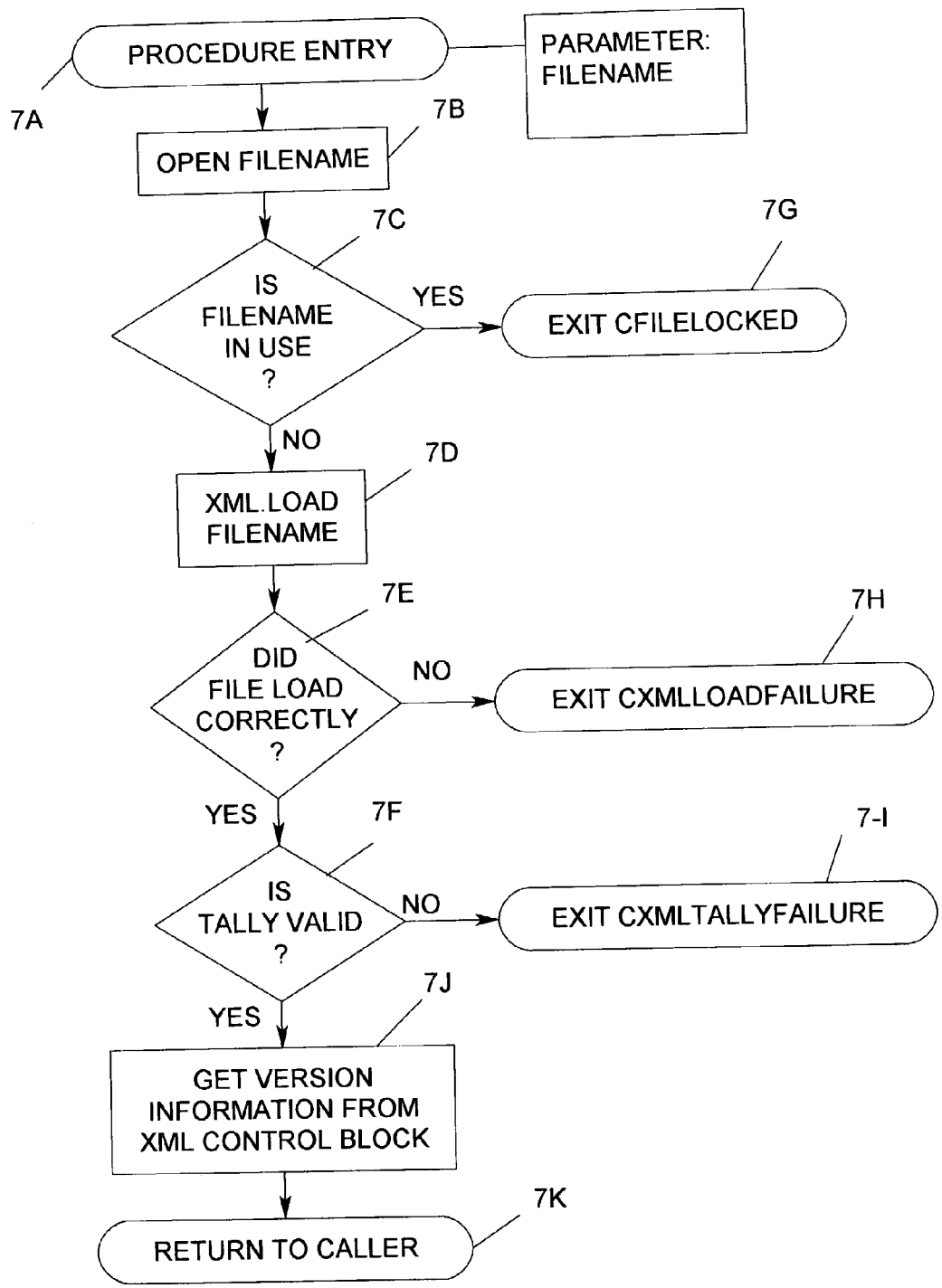
FIG. 7 is a flowchart, which shows the procedure for opening XML files and finding the version.

Now referring to FIG. 7, which illustrates opening of, and finding a version of XML files and begins with a procedure entry point (item 7A), which expects to receive the parameter filename. The filename is then opened as specified by filename (item 7B). An inquiry is then made (item 7C) to check if the files referenced by the filename are in use. If the file is in use (yes), the process exits passing a parameter back saying that the file is locked (CFILELOCKED) at item 7G. If the file is not in use (no), a procedure for XML.LOAD file is processed (item 7D), which actually reads and loads the XML file for processing. Another inquiry is then made (item 7E) to see if the file loaded correctly. If the file did not load correctly (no), the process exits passing a parameter back with an error code (CXMLLOADFAILURE) at item 7H. If the file did load correctly (yes), verification is made (item 7F) to check if the TALLY field within the file is valid. If the TALLY field is not valid (no), the process exits (item 7I), with an exit code of CXMLTALLYFAILURE. If the TALLYFIELD is valid in inquiry 7F, a procedure to get the version information from the XML control block is processed (item 7J). The process then returns, to the caller, a return code of success at item 7K.

Figure 8A:
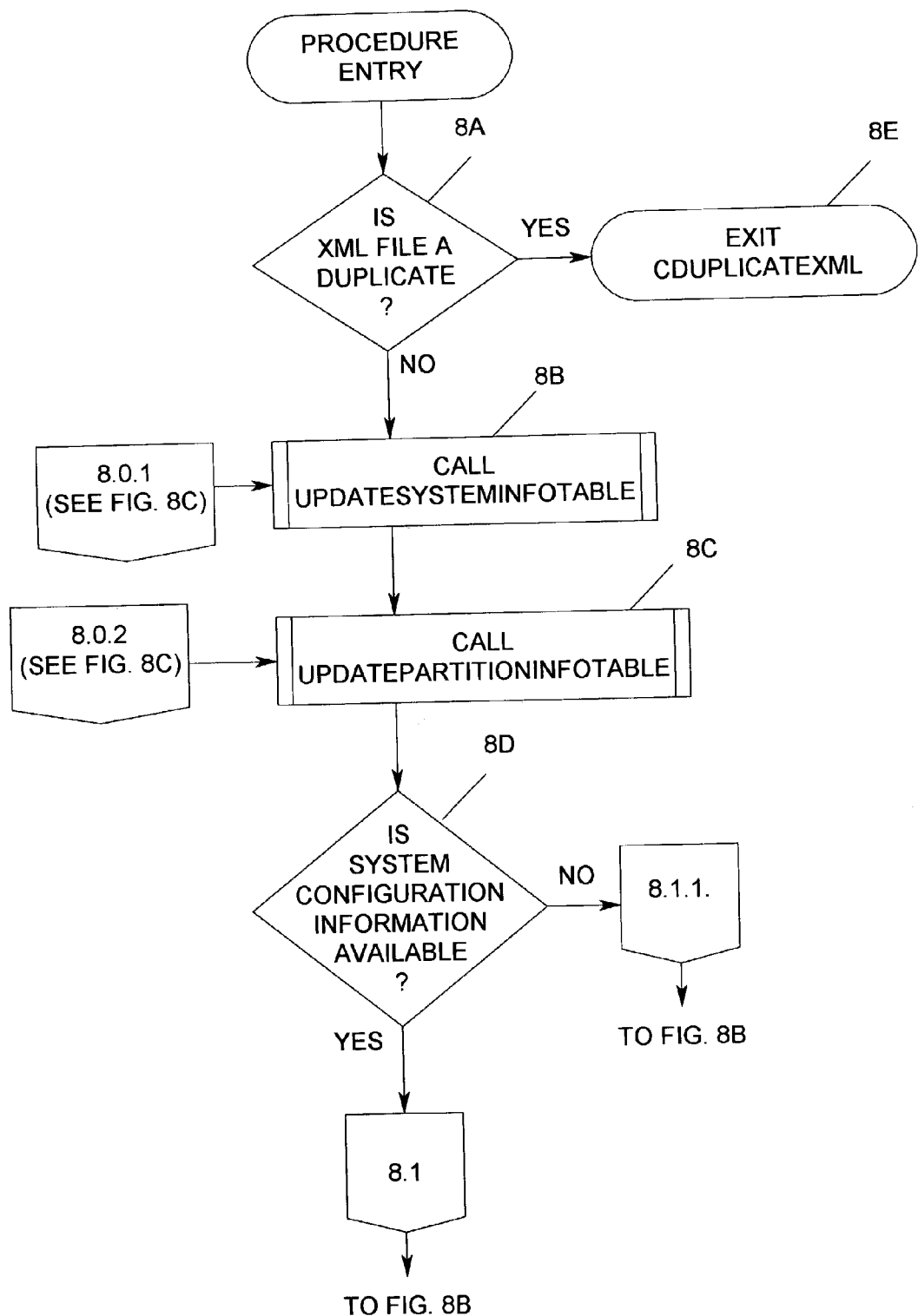
FIGS. 8A, 8B, and 8C illustrates the procedure for reading an XML file.
Figure 8B:
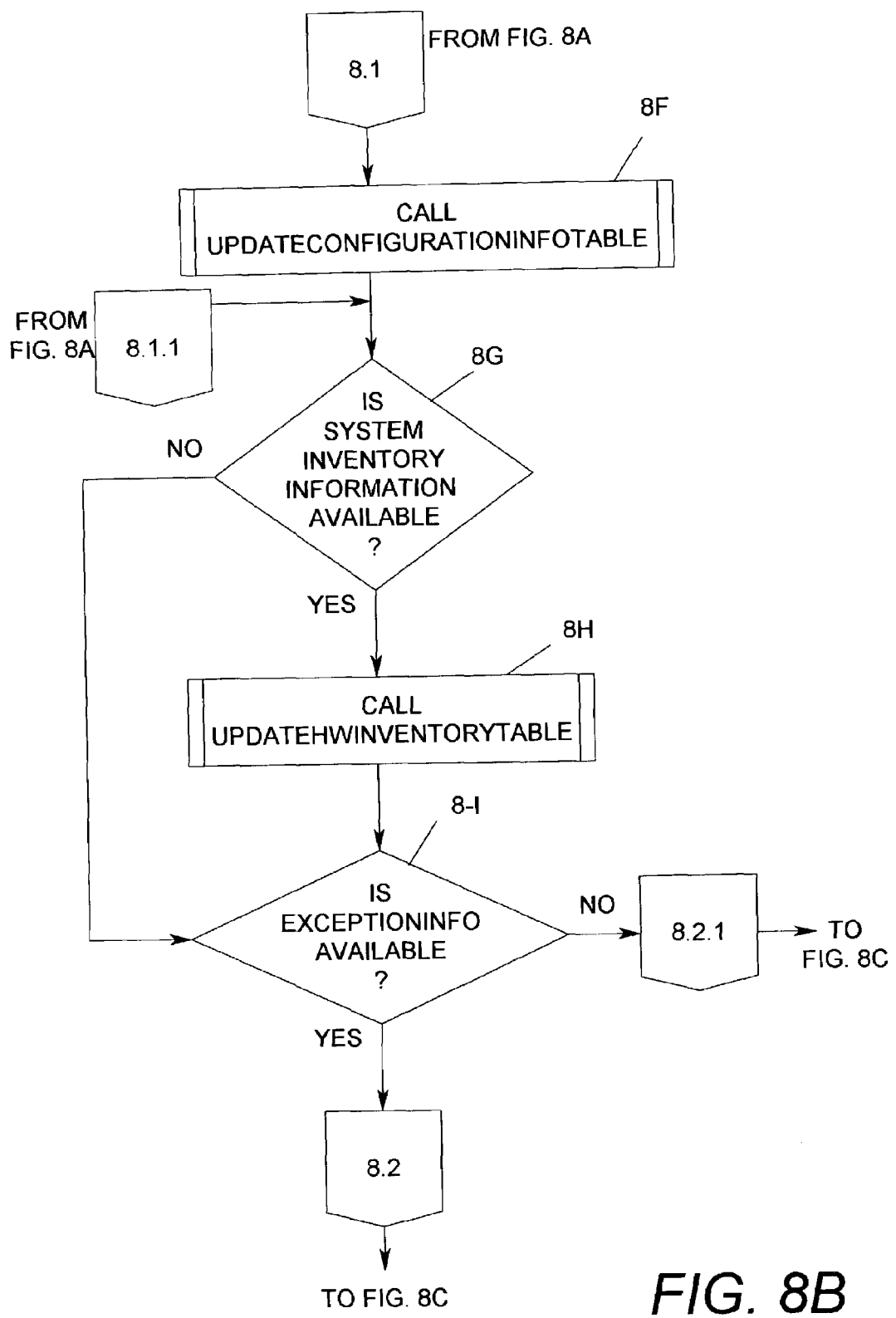
Figure 8C:
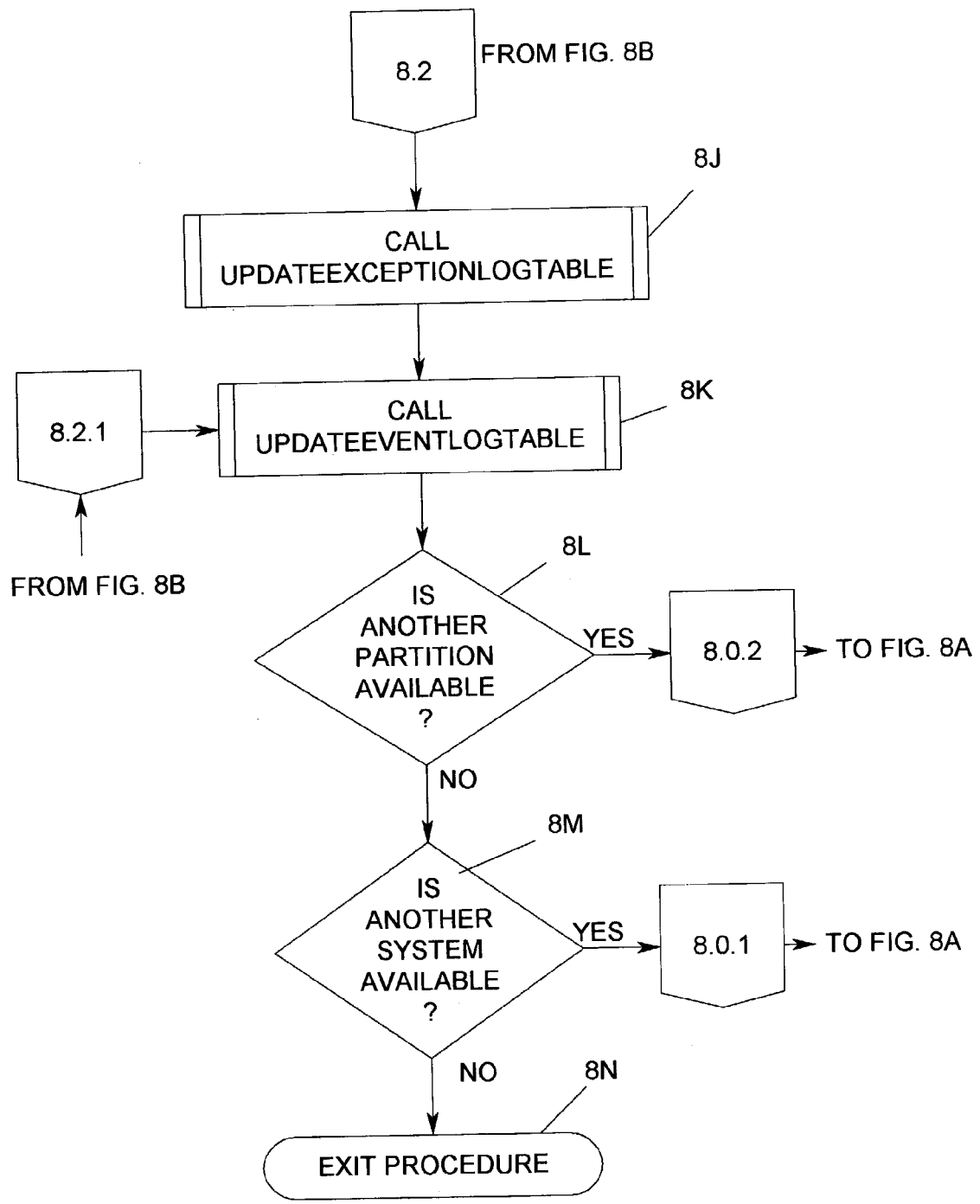

FIGS. 8A, 8B, and 8C illustrate the procedure for reading an XML file, READXMLFILE 3P.

Referring now to FIG. 8A, which begins with a procedure entry point, and is followed by an inquiry to check if the XML file is a duplicate (item 8A). If the file is a duplicate (yes), the process exits with an error code of CDUPLICATEXML (item 8E). If the XML file is not a duplicate (no), procedure UPDATESYSTEMINFOTABLE is called (item 8B) which will update the SystemInformation table in the Unisys proprietary engineering database with the system information contained in the XML file. Next, procedure UPDATEPARTITIONINFOTABLE (item 8C) is called which will update the PartitionInformation table in the Unisys proprietary engineering database with partition information contained in the XML file. An inquiry is then made (item 8D) to check if the system configuration information is available. If the information is not available (no), the process proceeds to FIG. 8B at item 8G. If the information is available (yes), the process proceeds to FIG. 8B at item 8F.

Referring now to FIG. 8B. Since system configuration information is available from FIG. 8A, item 8D, then a procedure to call UPDATECONFIGURATIONINFOTABLE is processed (item 8F). This transfers all information out of the XML file that pertains to configuration information into the ConfigInformation table in the Unisys proprietary engineering database 1H. An inquiry is then made at item 8G, whether the system inventory information is available. If the information is available (yes), a procedure to call UPDATEHWINVENTORYTABLE is processed (item 8H). This moves the information from the XML file that pertains to INVENTORY into the inventory table in the Unisys proprietary database 1H. If the information is not available (no) in inquiry 8G, an inquiry is made to check if the EXCEPTIONINFO is available at item 8I. Inquiry 8I checks the EXCEPTIONINFO. If the EXCEPTIONINFO is available (yes), the process proceeds to FIG. 8C, item 8J. If the EXCEPTIONINFO is not available (no), the process proceeds to FIG. 8C, at item 8K.

Referring now to FIG. 8C, which begins with a call to UPDATEEXCEPTIONLOGTABLE (item 8J), which moves all the exception log information from the XML file to the exception log table in the central Unisys database. Exception information could include messages regarding the failure of the Availability Monitor program scan process to log in to a service processor or partition. Next, a call is made on the UPDATEEVENTLOGTABLE (item 8K), which moves all the information out of the XML files that pertains to the events to the event log table in the Unisys central engineering database. An inquiry is then made to determine if there is another partition with information available in the XML file (item 8L). If the answer to inquiry 8L is yes, proceed to FIG. 8A, item 8C. If the answer to inquiry 8L is no, another inquiry is made to check if there is another system available in the XML file (item 8M). If the answer to inquiry 8M is yes, proceed to FIG. 8A, item 8B. If there is no more information available in the XML file (no), the procedure exits at item 8N.

Figure 9A:
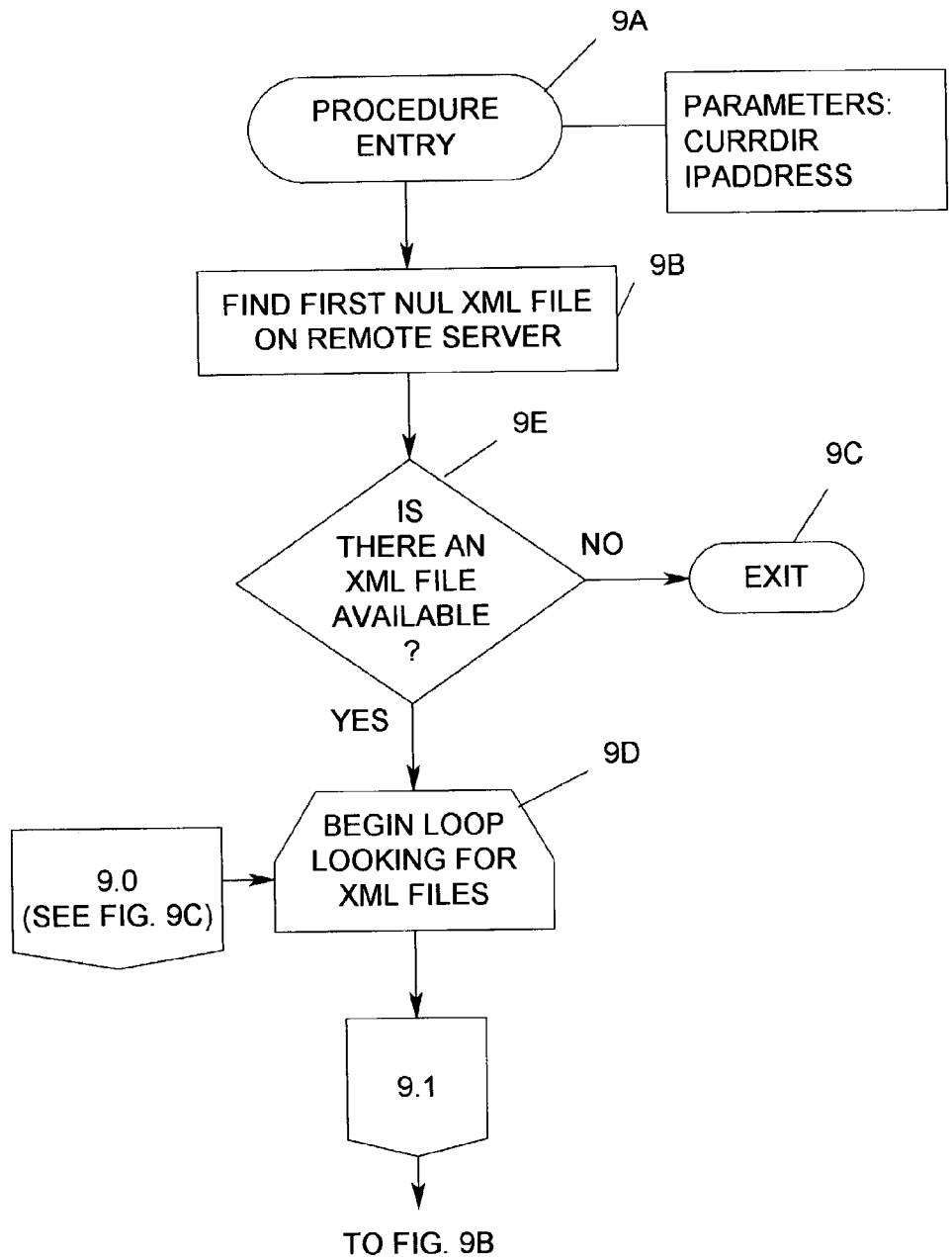
FIGS. 9A, 9B, and 9C illustrates the procedure for moving XML files.
Figure 9B:
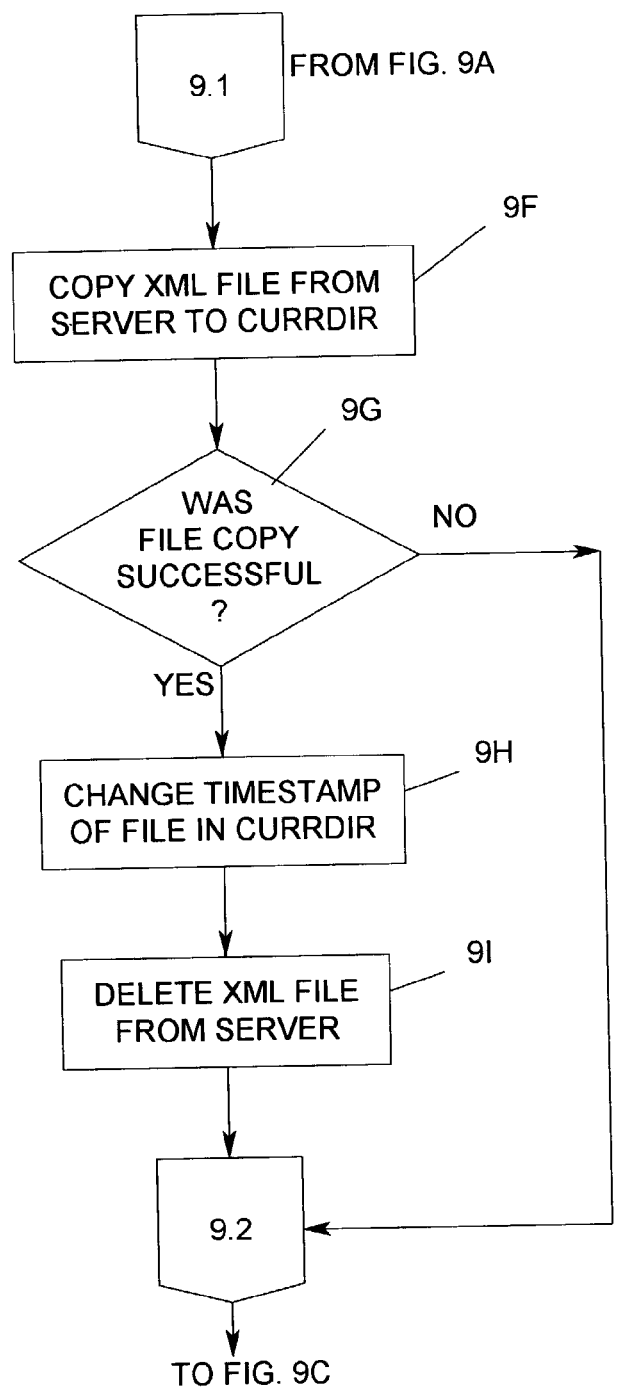
Figure 9C:
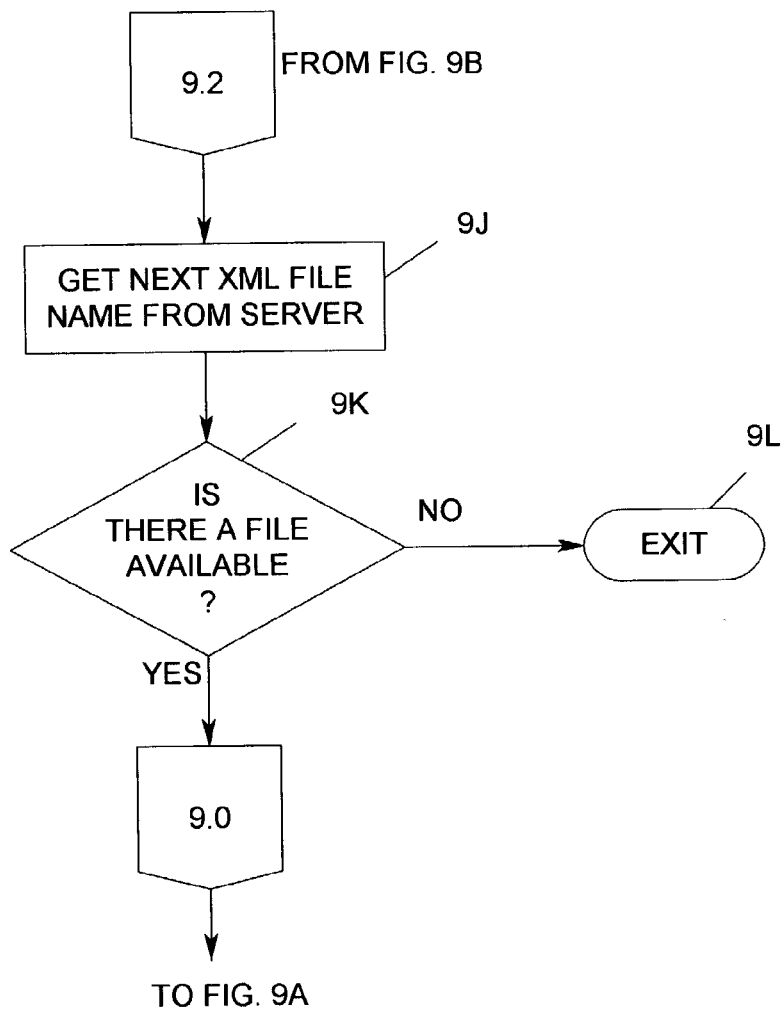

FIGS. 9A, 9B, and 9C show the procedure for moving XML files, MOVEXMLFILES 4D.

Referring now to FIG. 9A, which begins with an entry point into the procedure (item 9A), expecting parameters: current directory, and IP address. Next, the first XML file on the remote server is found (item 9B). An inquiry is then made (item 9C) to check if there is an XML file available. If there is no XML files available (no), the procedure exits at item 9C. If there is an available XML file (yes), a loop looking for XML files is begun at item 9D. The loop then proceeds to FIG. 9B, item 9F.

Now referring to FIG. 9B, which begins with a process to copy XML file from the server to the current directory or to the pointer where the current directory is, based on the parameter that is passed in (item 9F). This is followed by an inquiry (item 9G) to check if the file copy was copied successfully. If the file copy was not copied successfully (no), the sequence proceeds to FIG. 9C, item 9J. If the file copy was successful (yes), the timestamp of the file is changed in the current directory (item 9H) to reflect the current time that the file was moved. The XML file is then deleted from the server at item 9I, which then proceeds to FIG. 9C, item 9J.

Referring now to FIG. 9C, which begins with a process to get the next XML file name from the server (item 9J). An inquiry is followed to check if there is an XML file available (item 9K). If there is a file available (yes), the process continues at FIG. 9A, item 9D to begin looping to look for XML files. If there are no files available (no), the procedure exits at item 9L.

Figure 10:
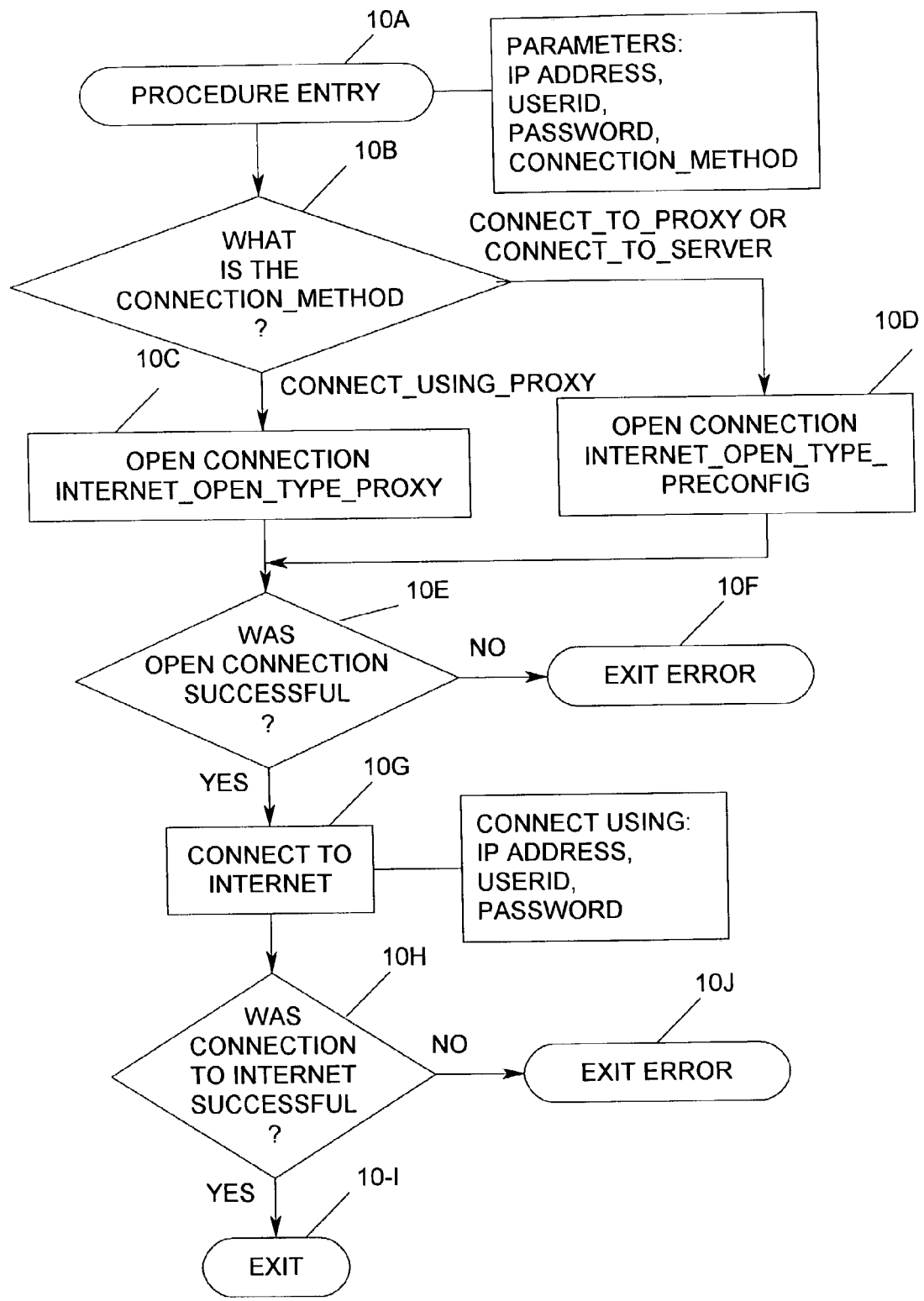
FIG. 10 is a flowchart, which shows the procedure for making a connection to the Internet.

Referring now to FIG. 10, which illustrates a "make connection" process MAKECONNECTION 6E, and begins with a procedure entry point (item 10A) by expecting parameters: IP address, userid, password, and CONNECTION_METHOD. CONNECTION_METHOD can be CONNECT_TO_PROXY or CONNECT_TO_SERVER. An inquiry is then made (item 10B) to check what the connection method is. If the connection method is CONNECT_TO_PROXY, CONNECT_USING_PROXY or CONNECT_TO_SERVER, a process is set to open connection INTERNET_OPEN_TYPE_PRECONFIG (10D), which is an FTP open connection function. The process 10D then turns to inquiry 10E to check if the open connection was successful. If at 10B, the connection method is CONNECT_USING_PROXY, the connection is opened with INTERNET_OPEN_TYPE_PROXY (item 10C). INTERNET_OPEN_TYPE_PROXY is an FTP function. An inquiry is then made to If the open connection was not successful (no), the process exits with an error at item 10F. If the open connection was successful (yes), a CONNECT_TO_INTERNET is issued, which is an FTP function (item 10G). This connection is made using the IP address, userid, and password that were all passed in. Another inquiry is then made to check if the connection to the Internet was successful (item 10H). If the Internet connection was successful (yes), the procedure exits at item 10I. If the connection to the Internet was not successful (no), the procedure exits with an error at item 10J.

Figure 11:
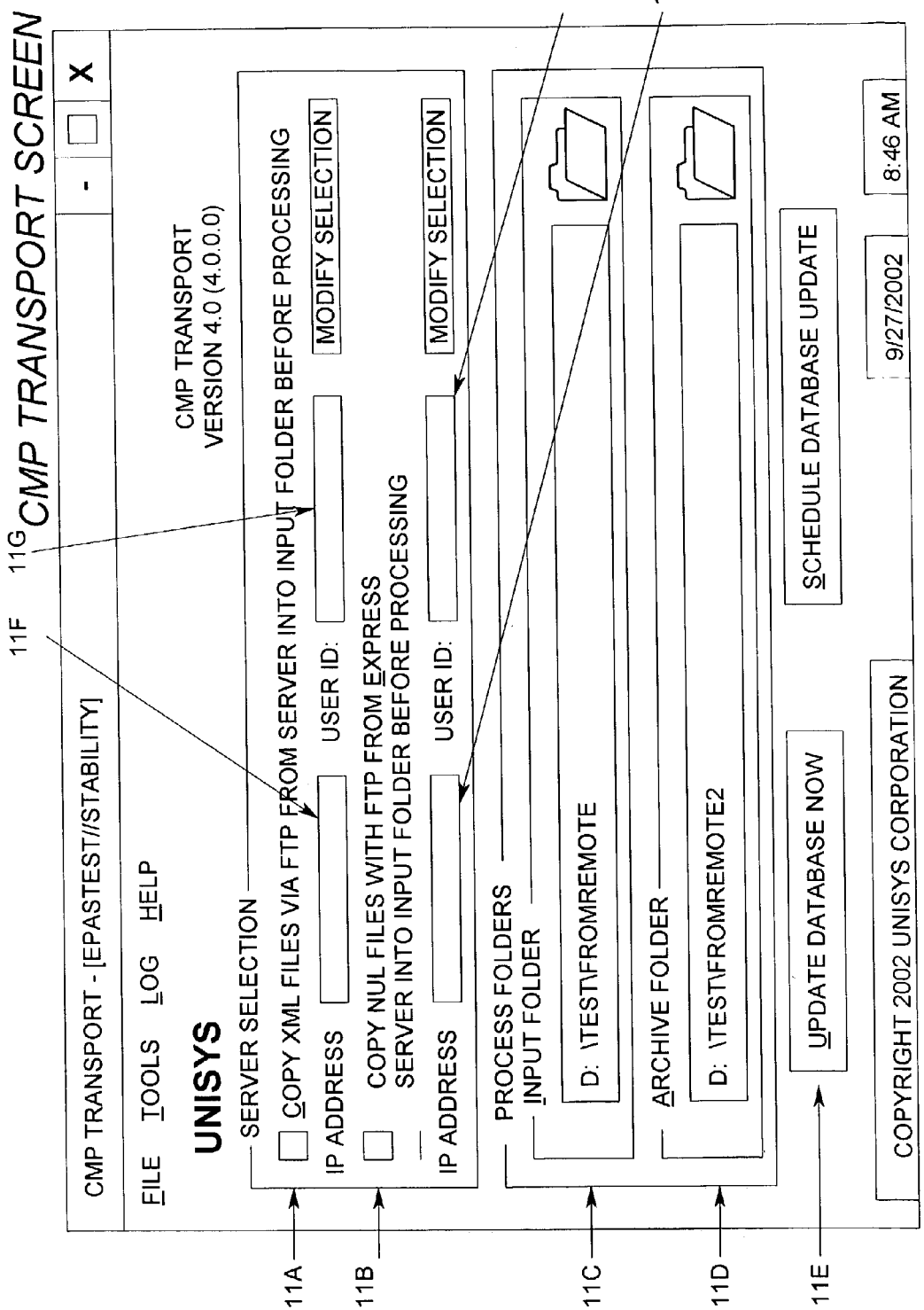
FIG. 11 is a screen shot illustrating the Cellular Multi-Processor (CMP) Transport screen.

Now referring to FIG. 11, which shows a window screen snap shot of the Cellular Multi Processor (CMP) Transport screen, and the user inputted fields within. Checkbox 11A enables the copying of XML files NUL from the server into the input folder when it is checked. This is defined in further detail in field 11C. Checkbox 11B enables the copying of XML files from the Express server into the input folder as defined in 11C. Textbox 11C specifies the particular folder that the XML files will be moved to from the server and where they will be found for subsequent processing. Textbox 11D specifies the folder where the XML files will be moved to for archiving after they are processed. Command button 11E causes the CMP Transport to process "Update Database Now". Textbox 11F specifies the Internet Protocol (IP) address of the server. Textbox 11G specifies the User ID required to access the server at the IP address in 11F. Textbox 11H specifies the Internet Protocol (IP) address of the Express server. Textbox 11I specifies the User ID required to access the Express server at the IP address in 11H.

Described herein has been a system and method for scanning and returning availability data and stability data utilizing an Availability Monitor program in a Service Processor, which supports a Cellular Multi-Processor, which manages several different Operating Systems (partitions). The availability and stability data is transported to a central engineering database for subsequent analysis. The stability data is secured from non-secure sites through a firewall. XML files are imported via the Internet to a central engineering group where information as to system and application software can be viewed as to starts, stops, errors, etc, which indicate the time and source of the events involved.

Though one embodiment of the invention has been described, other embodiments may be used which still are encompassed by the attached claims.

What is claimed is:

1. A system for securely transporting proprietary customer configuration and availability data from a plurality of separately operating customer servers via a non-secure public server to a secure company operating server such that said company is provided with timely access to said customer configuration and stability data for providing customer support services for said customer servers, said stability data including customer availability data and customer configuration data including a user code for each customer server, said system comprising:

(a) first means provided in each customer server including a processor system event log, an application event log and also an availability monitor program which periodically scans said event logs to collect pertinent availability data for determining customer availability, wherein said customer availability for each customer server over a given time interval is determined based on the time during said interval for which the customer server is considered up and running, said first means also providing for transporting the collected availability data for each customer server along with customer configuration data for each server to said non-secure public server;

(b) second means for transporting said collected customer availability data along with customer configuration data from said non-secure public server through a firewall to said secure company operating server;

(c) said first and second means using said user code for each customer server and other customer configuration data so that each customer is provided with only restricted write access to said public non-secure server and said secure company operating server to protect information from one customer being available to other customers; and (d) third means located in said secure company operating server for processing transported customer availability data to provide results indicative of the availability of each customer server, said processing being initiated in response to transporting of said customer availability data to said secure company operating server;

(e) said secure company operating server also including a central proprietary database which receives the results of said processing, said central proprietary database being accessible only to people in said secure company operating server;

(f) said abovementioned first and second means operating such that the collecting and transporting of customer availability data from said customer servers and the transporting thereof to said secure company operating server via said non-secure public server is able to function automatically after initial set-up.

2. The system of claim 1, wherein the transported customer data is provided to said third means as XML files and wherein said secure company operating server includes:

means for receiving and importing said files into a temporary input folder;

means using an OPENXMLANDFINDVERSION program to open each XML file and verify it; and means to receive each said verified file from said input folder and to read it via an READXMLFILE process for output to said central proprietary database.

3. The system of claim 2, wherein said secure company operating server also includes:

means to utilize a MAKECONNECTION process to access XML files collected on said public server;

means to find each XML file on said public server;

means to copy each XML file into a current directory input folder; and means to get a timestamp to indicate the time that said XML file was moved into the current directory input folder.

4. The system of claim 2, wherein said OPENXMLAND-FINDVERSION process includes:

means to open and load an XML file;

means to get version information from an XML control block; and means to provide and check a tally of said XML file to verify that no modification has occurred.

5. The system of claim 2, wherein said means to receive each verified XML file includes:

means to call a process UPDATASYSTEMINFOTABLE to move information from said XML file into a central database;

means to call a process UPDATEPARTITIONIN-FOTABLE to store partition information into a central database;

means to check that the system configuration information is available; and means to call a process UPDATECONFIGURATIONIN-FOTABLE to store system configuration information from said XML file to said central database.

6. The system of claim 5, which further includes:

means to call a process UPDATEWINVENTORYTABLE to store hardware inventory information from said XML file into a central database;

means to call a process UPDATEEXCEPTIONLOG-TABLE to move exception information from said XML file to said central database; and means to call a process UPDATEEVENTLOGTABLE to store stability information from said XML file to said central database.

7. The system of claim 1, wherein said customer data is provided as XML files and wherein said secure company operating server includes:

means for receiving and importing NUL X files from a public express server;

means to make connection to said public express server and set the current director to "SENTINEL", which holds said XML files;

means to find a first NUL XML file and subsequent NUL XML files available and to copy each NUL XML file to said current directory;

means to change the timestamp of each copied XML file in said current directory; and means to delete each copied NUL XML file from said public express server.

8. The system of claim 7, wherein said means to make connection includes:

means to select a connection to a Proxy Server, and means for making a connection to a public express server using said Proxy Server.

9. The system of claim 8, wherein said means to select includes:

means for utilizing an OPEN-CONNECTION Internet_OPENTYPE_PRECONFIGURATION FTP parameter to establish a connection to a server, which may include:

(i) said Proxy Server;

(ii) said public server.

10. The system of claim 8, wherein said means to make a connection further includes:

means to complete a connection to the Internet.

* * * * *